US012691868B2

(12) United States Patent
Abel et al.

(10) Patent No.: US 12,691,868 B2
(45) Date of Patent: Jul. 28, 2026

(54) AUTOMATED YARD INVENTORY

(71) Applicant: Outrider Technologies, Inc., Brighton, CO (US)

(72) Inventors: Justin Abel, Brighton, CO (US); Brook Thomas, Brighton, CO (US); Daniel McCoy, Brighton, CO (US); Tron Vo, Brighton, CO (US); Gabe Netty, Brighton, CO (US); Martin Gaudreault, Brighton, CO (US); Philippe Ferriere, Brighton, CO (US); Harrison Magee, Brighton, CO (US); Elizabeth Gilmour, Brighton, CO (US); Artem Kozlov, Brighton, CO (US); Jason Khadka, Brighton, CO (US); Kathleen A. Mahoney, Brighton, CO (US)

(73) Assignee: Outrider Technologies, Inc., Henderson, CO (US)

(*) Notice: Subject to any disclaimer, the term of this patent is extended or adjusted under 35 U.S.C. 154(b) by 146 days.

(21) Appl. No.: 18/645,871

(22) Filed: Apr. 25, 2024

(65) Prior Publication Data

US 2024/0359682 A1 Oct. 31, 2024

Related U.S. Application Data

(60) Provisional application No. 63/462,500, filed on Apr. 27, 2023.

(51) Int. Cl.
*B60W 30/06* (2006.01)
*B60R 1/27* (2022.01)
*B60W 50/00* (2006.01)
(52) U.S. Cl.
CPC .............. *B60W 30/06* (2013.01); *B60R 1/27* (2022.01); *B60W 50/00* (2013.01);
(Continued)

(58) Field of Classification Search
CPC ................. B60W 30/06; B60W 50/00; B60W 2420/408; B60W 2050/0005; B60W 2300/14; B60R 1/27
See application file for complete search history.

(56) References Cited

U.S. PATENT DOCUMENTS 6,148,291 A * 11/2000 Radican ............... G06Q 10/087
705/28
7,119,674 B2 * 10/2006 Sefton .................... G07B 15/04
340/521
(Continued)

FOREIGN PATENT DOCUMENTS

CN 203276591 U * 11/2013
CN 113299108 A * 8/2021 ............. G08G 1/148
(Continued)

OTHER PUBLICATIONS

International Patent Application No. PCT/US24/26193 Invitation to Pay Additional Fees dated Jun. 25, 2024, 3 pages.
(Continued)

*Primary Examiner* — Chico A Foxx
(74) *Attorney, Agent, or Firm* — Cozen O'Connor

(57) ABSTRACT

A tractor has a processor and memory storing machine-readable instructions that, when executed by the processor, cause the processor to: select at least one image captured by a camera of a parking spot being passed by the tractor when a point-of-interest (POI) of the parking spot is most centered within a field of view of the camera, store the image in the memory in association with the parking spot, determine that the parking spot is occupied after a costmap for the parking spot is populated by the LIDAR, retrieve the image corresponding to the parking spot from the memory, determine, from the image, a trailer identifier of a trailer parked in the parking spot; and send a message defining the parking spot
(Continued)

and the trailer identifier to an inventory service for use in updating a yard inventory.

19 Claims, 11 Drawing Sheets

(52) U.S. Cl.
CPC . *B60W 2050/0005* (2013.01); *B60W 2300/14* (2013.01); *B60W 2420/408* (2024.01)

(56) References Cited

U.S. PATENT DOCUMENTS

| | | | | |
|---|---|---|---|---|
| 7,783,530 | B2 * | 8/2010 | Slemmer | G06Q 30/0633 |
| | | | | 705/28 |
| 2003/0233189 | A1 | 12/2003 | Hsiao et al. | |
| 2006/0253226 | A1 * | 11/2006 | Mendelson | G06Q 30/0261 |
| | | | | 701/1 |
| 2013/0057686 | A1 * | 3/2013 | Genc | G08G 1/0141 |
| | | | | 348/148 |
| 2013/0226945 | A1 | 8/2013 | Swinson et al. | |
| 2014/0270524 | A1 * | 9/2014 | Diamond | H04N 1/00209 |
| | | | | 382/170 |
| 2018/0053141 | A1 * | 2/2018 | Shydo, Jr. | G05D 1/104 |
| 2018/0095474 | A1 | 4/2018 | Batur et al. | |
| 2019/0064835 | A1 * | 2/2019 | Hoofard | G05D 1/228 |
| 2019/0066503 | A1 * | 2/2019 | Li | G05D 1/0094 |
| 2019/0187716 | A1 | 6/2019 | Cantrell et al. | |
| 2020/0278688 | A1 * | 9/2020 | Sarkar | B62D 15/0285 |
| 2021/0284198 | A1 | 9/2021 | Schmidt et al. | |
| 2021/0394636 | A1 | 12/2021 | Meyer | |
| 2022/0076576 | A1 * | 3/2022 | Clemmer | G08G 1/0116 |
| 2022/0114893 | A1 | 4/2022 | Kim et al. | |
| 2022/0148427 | A1 * | 5/2022 | Emadi | G08G 1/146 |
| 2022/0180281 | A1 | 6/2022 | Walton | |
| 2022/0365541 | A1 * | 11/2022 | Gusikhin | G06V 20/54 |
| 2022/0410898 | A1 * | 12/2022 | Nett | B60W 60/0025 |
| 2023/0005277 | A1 * | 1/2023 | Ge | G06V 20/586 |
| 2023/0138464 | A1 * | 5/2023 | Gribko | G06V 10/273 |
| | | | | 382/103 |
| 2023/0401863 | A1 * | 12/2023 | Perras | G06Q 10/00 |
| 2024/0246529 | A1 * | 7/2024 | Wang | B60W 30/06 |
| 2024/0362572 | A1 * | 10/2024 | Arora | G05D 1/225 |
| 2025/0148415 | A1 * | 5/2025 | Ginn | G06V 20/63 |
| 2025/0252752 | A1 * | 8/2025 | Ibanez | G06V 10/70 |

FOREIGN PATENT DOCUMENTS

| | | | | | | |
|---|---|---|---|---|---|---|
| CN | 113628088 | A | * | 11/2021 | | G06T 17/00 |
| CN | 114076960 | B | * | 12/2024 | | G08G 1/04 |
| CN | 119790418 | A | * | 4/2025 | | H04N 7/183 |
| DE | 102012005575 | A1 | * | 9/2013 | | B62D 1/00 |
| DE | 102018218436 | A1 | * | 5/2019 | | G06T 7/60 |
| WO | 2021226062 | A1 | | 11/2021 | | |
| WO | 2022/104276 | A2 | | 5/2022 | | |
| WO | WO-2023283612 | A1 | * | 1/2023 | | G08G 1/144 |

OTHER PUBLICATIONS

International Search Report and Written Opinion for PCT/US2024/026193 dated Sep. 4, 2024, 24 pages.
International Search Report and Written Opinion issued in related International Patent Application No. PCT/US23/30156, mailed Dec. 11, 2023, 10 pages.

* cited by examiner

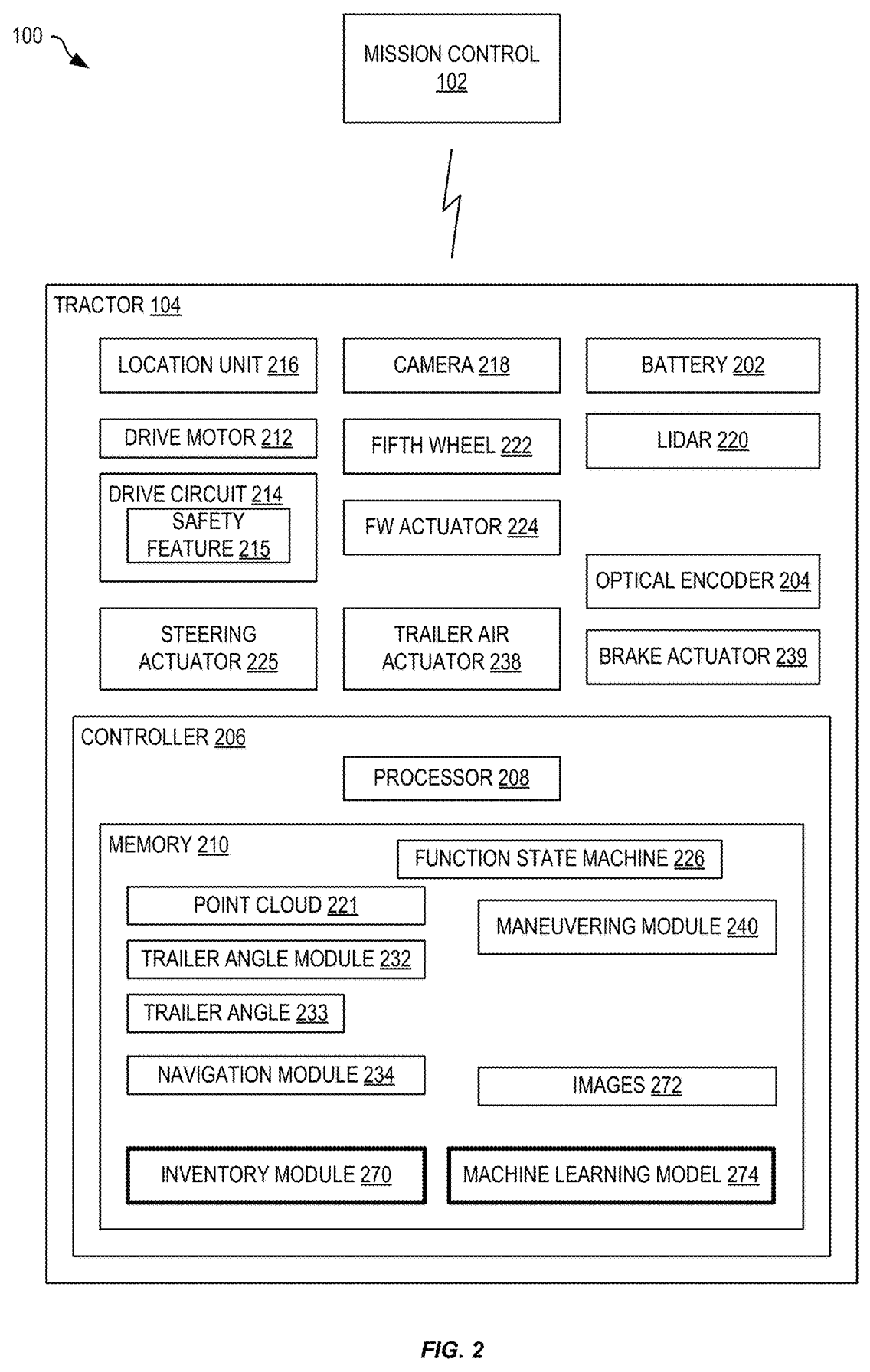

100

MISSION CONTROL
102

TRACTOR 104

LOCATION UNIT 216

CAMERA 218

BATTERY 202

DRIVE MOTOR 212

FIFTH WHEEL 222

LIDAR 220

DRIVE CIRCUIT 214
SAFETY FEATURE 215

FW ACTUATOR 224

OPTICAL ENCODER 204

STEERING ACTUATOR 225

TRAILER AIR ACTUATOR 238

BRAKE ACTUATOR 239

CONTROLLER 206

PROCESSOR 208

MEMORY 210

FUNCTION STATE MACHINE 226

POINT CLOUD 221

MANEUVERING MODULE 240

TRAILER ANGLE MODULE 232

TRAILER ANGLE 233

NAVIGATION MODULE 234

IMAGES 272

INVENTORY MODULE 270

MACHINE LEARNING MODEL 274

*FIG. 2*

AUTOMATED YARD INVENTORY

CROSS-REFERENCE TO RELATED APPLICATIONS

This application claims priority to U.S. Patent Application Ser. No. 63/462,500, titled "Automated Yard Inventory," filed Apr. 27, 2023, which is incorporated herein by reference in its entirety.

BACKGROUND

Many companies that operate large shipping yards are dependent on maintaining and referencing a yard inventory of their assets in their yard. Building and maintaining a yard inventory is conventionally a manual process. Organizations spend a significant amount of time and money manually maintaining their yard inventory. This manual process is both slow, delaying high priority trailer moves within the yard, and error prone, resulting in compounded errors in locating and moving trailers. Manual labor is also expensive, and may put humans in a dangerous environment (e.g., when operating on foot or within a small vehicle such as a golf cart).

SUMMARY

One aspect of the present embodiments includes the realization that when yard inventory generation is slow and/or when the yard inventory is error prone, efficiency of trailer movement within the yard is directly affected. The present embodiments solve this problem by providing an autonomous yard inventory system that detects trailer characteristics (e.g., trailer identifiers) and automatically maintains an accurate yard inventory of trailer assets in a yard. Most current methods of maintaining an inventory of the yard involve manually surveying each trailer in the yard which is both time consuming and error prone. There may also be latency between data collection and upload that negatively impacts performance at an autonomous yard. Errors in the yard inventory cause significant delays and compounded errors when locating and moving trailers. By maintaining an accurate and current (e.g., frequently updated) yard inventory, efficiency of trailer movement is significantly improved.

The autonomous yard inventory system uses an electric autonomous vehicle to detect trailer characteristics of trailers in parking spots and dock spots to continuously update and maintain accuracy of the yard inventory by either (a) an active mode of running dedicated inventory missions (e.g., controlling the electric autonomous vehicle to perform a survey loop—generic loop, by zones, and/or by directed by specific inventory—around the yard to detect the trailer characteristics and/or empty parking spots) and (b) a passive mode that causes the electric autonomous vehicle to detect the trailer characteristics when performing other missions (e.g., moving a trailer from one spot to another, moving to a charging location, etc.). When operating in the passive mode, the autonomous yard inventory system allows the yard inventory to be updated while the autonomous electric vehicle is performing other tasks, resulting in the yard inventory being continuously updated and thereby more accurate as compared to manual solutions of the prior art, which significantly reduces costly errors from incorrectly identified trailers and/or old data. For example, this prevents the yard management system from directing the autonomous electric vehicle to fetch a trailer from an incorrect spot.

The autonomous yard inventory system may interface closely with a machine learning (ML) stack that passes images of a parking spot or dock spot to a model that detects the trailer characteristics (e.g., trailer ID, trailer type, and trailer length). The autonomous electric vehicle may determine an identity of the parking spot or dock spot based on its location and orientation of the camera. The trailer characteristics and parking spot identity are then sent as an inventory update (e.g., trailer with ID "1234" is now in parking spot 42) to a cloud based inventory service that maintains the yard inventory.

When the cloud instance receives the inventory update from the autonomous electric vehicle, the trailer ID is passed through an algorithm that attempts to find a best match in a database of trailers. The cloud instance uses a matching algorithm that first calculates the Levenshtein distance between the ML models detection of the ID and all trailer IDs in the database. The cloud instance uses this distance metric to calculate a "percent match" between the detection and IDs in the database. Only IDs in the database that have greater than a threshold percent match (e.g., 80%) are considered. Where multiple trailer IDs in the database match with a score greater than the threshold, the trailer ID with the highest percent match is used.

In certain embodiments, the techniques described herein relate to an autonomous yard inventory system for a yard having a plurality of parking spots for trailers, including: a tractor having: a first camera fixedly mounted to the tractor and having a first field of view; at least one LIDAR fixedly mounted to the tractor; at least one processor; and memory storing machine-readable instructions that, when executed by the processor, cause the processor to: select, from images captured by the first camera as the tractor passes a first parking spot of the plurality of parking spots, at least one first image of the first parking spot; store the first image in the memory in association with the first parking spot; determine an occupancy of the first parking spot from LIDAR data generated by the LIDAR; and when the occupancy indicates a trailer is parked within the first parking spot: retrieve the first image corresponding to the first parking spot from the memory; determine, from the first image, a trailer identifier of the trailer parked in the first parking spot; and send a message, to an inventory service that updates a yard inventory, indicating the trailer with the trailer identifier is parked in the first parking spot.

In certain embodiments, the techniques described herein relate to an autonomous yard inventory system, including: a yard inventory tracking location of trailers in parking spots of a facility; and an inventory service having machine-readable instructions stored in non-transitory memory and executable by at least one processor to: receive an inventory update message from an autonomous vehicle operating at the facility, the message including a trailer identifier and a parking spot identifier; determine that the inventory update message includes a valid trailer identifier based upon a weighted Levenshtein distance technique; and update the yard inventory based on the inventory update message.

BRIEF DESCRIPTION OF THE FIGURES

FIG. 2 is a block diagram illustrating key functional components of the tractor of FIG. 1, in embodiments.

DETAILED DESCRIPTION OF THE EMBODIMENTS

Figure 1:
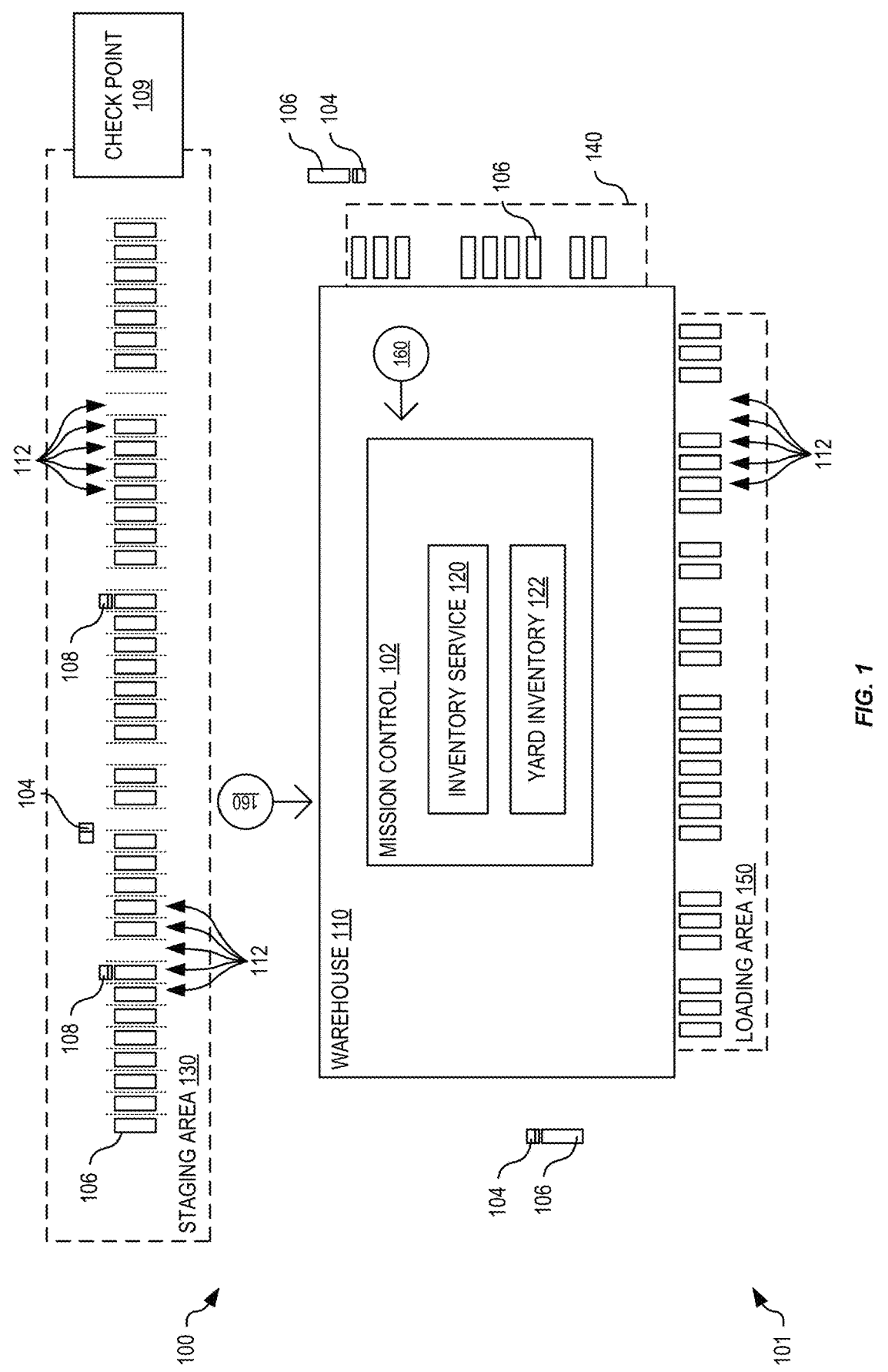
FIG. 1 is an aerial view showing one example autonomous yard inventory system operating within an autonomous yard, in embodiments.

FIG. 1 is an aerial view showing one example autonomous yard inventory system 100 operating within an autonomous yard 101 (e.g., a goods handling facility, shipping facility, etc.) that uses an autonomous tractor 104 to move trailers 106 between a staging area 130 and loading docks of a warehouse 110, in embodiments. FIG. 2 is a block diagram illustrating key functional components of tractor 104 of FIG. 1, in embodiments. FIGS. 1 and 2 are best viewed together with the following description.

The autonomous tractor 104 may be an electric vehicle or may use a combustion-based engine such as a diesel tractor. Tractor 104 includes a battery 202 for powering components of tractor 104 and a controller 206 with at least one digital processor 208 communicatively coupled with memory 210 (e.g., non-transitory memory) that may include one or both of volatile memory (e.g., RAM, SRAM, etc.) and nonvolatile memory (e.g., PROM, FLASH, Magnetic, Optical, etc.). Memory 210 stores a plurality of software modules including machine-readable instructions that, when executed by the at least one processor 208, cause the at least one processor 208 to implement functionality of tractor 104 as described herein to operate autonomously within autonomous yard 101 under direction from a mission control 102 (e.g., a computer software server that may be located offsite, in the cloud, fully onsite, or partially located within a facility building complex, shown as a warehouse 110). Mission control 102 may include machine-readable instructions stored in non-transitory memory and executable by at least one processor to implement functionality of mission control 102 described herein. For example, the at least one processor and memory may be part of computer software server and/or part of a cloud implementation.

Tractor 104 also includes at least one drive motor 212 controlled by a drive circuit 214 to mechanically drive a plurality of wheels (not shown) to maneuver tractor 104. Drive circuit 214 includes a safety feature 215 that deactivates motion of tractor 104 when it detects that rotation of drive motor 212 is impeded (e.g., stalled) and that drive motor 212 is drawing a current at or greater than a stalled threshold (e.g., above one of 400 A, 500 A, 600 A, 700 A, etc. depending on the configuration of the drive motor 212), for a predetermined period (e.g., five seconds). Safety feature 215 may thereby prevent damage to tractor 104 and/or other objects around tractor 104 when tractor 104 is impeded by an object. Safety feature 215 is described above with respect to an electric tractor. It should be appreciated that a similar safety feature could be included for diesel-based or other types of tractors, such as reducing engine power when an RPM threshold goes above a pre-set threshold. When safety feature 215 is tripped, tractor 104 requires manual reactivation before being able to resume movement. Accordingly, tripping safety feature 215 is undesirable.

Tractor 104 also includes a location unit 216 (e.g., a GPS receiver) that determines an absolute location and orientation of tractor 104, a plurality of cameras 218 for capturing images of objects around tractor 104, and at least one Light Detection and Ranging (LIDAR) device 220 (hereinafter LIDAR 220) for determining a point cloud about tractor 104. Cameras 218 are fixedly mounted to tractor 104 for example. Location unit 216, the plurality of cameras 218, and the at least one LIDAR 220 cooperate with controller 206 to enable autonomous maneuverability and safety of tractor 104. Tractor 104 includes a fifth wheel (FW) 222 for coupling with trailer 106 and a FW actuator 224 controlled by controller 206 to position FW 222 at a desired height. In certain embodiments, FW actuator 224 includes an electric motor coupled with a hydraulic pump that drives a hydraulic piston that moves FW 222. However, FW actuator 224 may include other devices for positioning FW 222 without departing from the scope hereof. Tractor 104 may also include an air actuator 238 that controls air supplied to trailer 106 and a brake actuator 239 that controls brakes of tractor 104 and trailer 106 when connected thereto via air actuator 238.

Controller 206 also includes a trailer angle module 232 that determines a trailer angle 233 between tractor 104 and trailer 106 based on one or both of a trailer angle measured by an optical encoder 204 positioned near FW 222 and mechanically coupled with trailer 106 and a point cloud 221 captured by the at least one LIDAR 220.

Over-the-road (OTR) tractors 108 deliver goods-laden trailers 106 from remote locations and retrieve trailers 106 for return to such locations (or elsewhere-such as a storage depot). In a standard operational procedure, OTR tractor 108 arrives with trailer 106 and checks-in at a facility entrance checkpoint 109. A guard/attendant enters information (e.g., trailer number or QR (ID) code scan-embedded information already in the system, which would typically include: trailer make/model/year/service connection location, etc.) into mission control 102. Warehouse 110 includes perimeter loading docks (located on one or more sides of the building), associated (typically elevated) cargo portals and doors, and floor storage, all arranged in a manner familiar to those of skill in shipping, logistics, and the like.

By way of a simplified operational example, after arrival of OTR tractor 108 and trailer 106, the guard/attendant at checkpoint 109 directs the driver to deliver trailer 106 to a specific numbered parking space in a designated staging area 130, which may include a large array of side-by-side trailer parking locations, arranged as appropriate for the facility's overall layout.

Once the driver has parked the trailer in the designated parking space of the staging area 130, he/she disconnects the service lines and ensures that connectors are in an accessible position (i.e. if adjustable/sealable), and decouples OTR tractor 108 from trailer 106. If trailer 106 is equipped with swing doors, this can also provide an opportunity for the driver to unlatch and clip trailer doors in the open position, if directed by yard personnel to do so.

Controller 206 may implement a mission executor 226 (also known as a function state machine) that controls operation of tractor 104 based upon commands (requests) received from mission control 102. For example, mission control 102 may receive a request (e.g., via an API, and/or via a GUI used by a dispatch operator, or via a mission planning algorithm that manages actions to be taken by the tractor) to move trailer 106 from a first location (e.g., slot X in staging area 130) to a second location (e.g., loading dock Y in unloading area 140). Once this request is validated, mission control 102 invokes a mission planner (e.g., a software package) that computes a 'mission plan' for each tractor 104. For example, the mission plan is an ordered sequence of high level primitives to be followed by tractor 104, in order to move trailer 106 from location X to location Y. The mission plan may include primitives such as drive along a first route, couple with trailer 106 in parking location X, drive along a second route, back trailer 106 into a loading dock, and decouple from trailer 106.

Mission executor 226 includes a plurality of states, each associated with at least one software routine (e.g., machine-readable instructions) that is executed by processor 208 to implements a particular function of tractor 104. Mission executor 226 may transition through one or more states when following the primitives from mission control 102 to complete the mission plan.

Controller 206 may also include an articulated maneuvering module 240, implemented as machine-readable instructions that, when executed by processor 208, cause processor 208 to control drive circuit 214 and steering actuator 225 to maneuver tractor 104 based on directives from mission control 102.

Controller 206 may also include a navigation module 234 that uses location unit 216 to determine a current location and orientation (e.g., a poise) of tractor 104. Navigation module 234 may also use other sensors (e.g., camera 218 and/or LIDAR 220) to determine the poise of tractor 104 using dead-reckoning techniques. Structures (e.g., facility entrance checkpoint 109, warehouse 110, and walls), pathways, roadways, other objects, and parking spots 112 of yard 101 are mapped (e.g., based on geographic location).

Mission control 102 includes an inventory service 120 that automatically maintains a yard inventory 122 (e.g., in a database) of yard 101. Yard inventory 122 defines which trailers 106 are parked in which parking spots 112 of yard 101 for example. Inventory service 120 uses tractor 104 to determine whether each parking spot 112 is occupied by a trailer to continuously update and maintain accuracy of yard inventory 122. Inventory service 120 operates tractor 104 in either (a) an active mode of running dedicated inventory missions (e.g., controlling tractor 104 to perform a survey loop around yard 101 to detect the trailer characteristics) or (b) a passive mode that causes tractor 104 to detect parking spot occupancy and other trailer characteristics when performing other missions (e.g., moving a trailer from one spot to another, moving to a charging location, etc.). When operating in the passive mode, inventory service 120 updates yard inventory 122 while the tractor 104 is performing other tasks, resulting in yard inventory 122 being substantially continuously updated and thereby maintaining yard inventory 122 more accurately, as compared to manual solutions of the prior art that only update their yard inventories periodically. Further, operating in the passive mode does not require dedication of tractor 104 for only that purpose. This autonomous and continuous update of yard inventory 122 significantly reduces costly errors caused by incorrectly identified trailers 106 and/or old data (e.g., a trailer still being indicated as parked in a parking spot after it has been moved). For example, autonomous and continuous update of yard inventory 122 prevents mission control 102 from directing tractor 104 to fetch a trailer 106 from an incorrect spot.

In the passive mode, as tractor 104 perform any type of yard operation, an inventory module 270 of tractor 104 (see FIG. 2) controls sensors of tractor 104 to check for nearby parking spots 112 that may contain trailers. In these embodiments, parking spots 112 are shown within staging area 130 and within loading area 150 (e.g., loading bays of warehouse 110) but may be any location where trailers 106 may be parked. In one operational example, as tractor 104 travels to collect trailer 106 from staging area 130 it passes many parking spots 112 within staging area 130 and/or loading area 150. For each parking spot 112 it passes, tractor 104 uses LIDAR 220 to collect lidar data relates to the parking spot and processes the lidar data to determine whether there is an object in the parking spot. If the software determines there is likely a trailer 106 in the parking spot, tractor 104 captures several images 272 of the parking spot from various cameras 218 of tractor 104.

Images 272 are sent to a machine learning model 274 that processes images 272 to determine trailer characteristics of trailer 106, such as a trailer ID, trailer type, and a trailer length, and provides a confidence score for the characteristics. When inventory module 270 receives a response from machine learning model 274 with a confidence level above a certain confidence threshold, inventory module 270 sends an inventory update message 160 to inventory service 120 that maintains yard inventory 122.

The following provides one example of inventory update message 160 sent from controller 206 to mission control 102 to report an inventory update of parking spot 112 within yard 101.

```
{
    timestamp: 1680643300.425,
    spot_id: "b8566221-e631-4b46-946c-0124bf7059eb",
    spot_state: "OCCUPIED",
    scac_id: "OUTR",
    serial_id: "12345",
    trailer_type: "DRY_VAN",
    trailer_length: 53,
    spot_images: [
        {
            image_url: "www.example_database.com/spot_image_1.jpg",
            annotations: {
                vertices: [{x: 0.25, y: 0.25}, {x: 0.25, y: 0.75},
{x: 0.75, y: 0.25}, {x: 0.75, y: 0.75}],
                label: "PS42"
            }
        },
```

-continued

```
{
    image_url: "www.example_database.com/spot_image_2.jpg",
    annotations: {
        vertices: [{x: 0.25, y: 0.25}, {x: 0.25, y: 0.75},
{x: 0.75, y: 0.25}, {x: 0.75, y: 0.75}],
        label: "PS42"
        }
    }
],
gladhand_type: "aluminum_phillips_45_rotational",
adjacent_trailer_distance: 1.3,
trailer_stops_present: false
}
```

The following provides a short description of each field:

timestamp: the system time (in seconds) when this inventory update message was created by the vehicle spot_id: A unique identifier for this parking spot, this identifier is a stringified 16-Byte Universally Unique Identifier (UUID). This ID corresponds to a spot record within a larger "map" of yard 101, which contains the geographic coordinates (e.g., derived from GPS survey) of all parking spots along associated with the corresponding UUID for each parking spot.

spot_state: Whether the spot is "OCCUPIED", "EMPTY", or "UNKNOWN".

scac_id: The "Standard Carrier Alpha Code" identifier. This is usually a set of 2-4 characters that uniquely identifies the carrier company that owns the trailer (ex: FED for "FedEx").

serial_id: A unique identifier (usually 4-6 characters) that uniquely identifies the trailer within the carrier fleet. Therefore, the combination of the SCAC ID and the Serial ID uniquely identifies a trailer. It is possible for the same serial ID to be used across different carrier fleets.

trailer_type: The type of trailer. Examples of trailer types are dry vans, refrigerated units, containers, tankers, etc.

trailer_length: The length of the trailer in feet. The most common trailer lengths are 53 ft, 28 ft, and 48 ft.

spot_images: A list of images of the spot (usually containing 2-3 images). Each entry in this list contains an object with the following sub-fields:

image_url: A URL to the location of the image of the parking spot as uploaded to the cloud service; and annotations: A list of points that define a polygon within the image to highlights a portion of the image relating to the parking spot for use when transcribing trailer characteristics.

gladhand_type: The type of gladhand on the trailer. This is detected and recorded to assist robotic glandhands connection success rates.

adjacent_trailer_distance: The minimum distance between the trailer in this spot and adjacent trailers. This is recorded and used by autonomous vehicle systems to determine the safety of moving the associated trailers.

trailer_stops_present: Whether there are any wheel chocks, trailer stands, or other trailer stops present on the trailer. If these are present a human must be notified before the AV can move the trailer.

When inventory module 270 receives a response from machine learning model 274 with a confidence level below a certain confidence threshold, inventory module 270 may send message 160 to a cloud service to request human assistance in determining the trailer characteristics. On receiving message 160, the cloud service forwards information needed for a human to label the image successfully to an application that serves active requests to humans. When a human responds, the determined trailer characteristics are sent to inventory service 120 to update yard inventory 122. This information may also be shared across tractors 104 to form a holistic approach to inventory monitoring. Machine learning model 274 provides a non-rigid holistic method of determining trailer identifier 322, since it looks at the estimated trailer ID and other trailer IDs in yard inventory 122 (and/or trailer database 460) to determine whether trailer identifier 322 is likely to be some other ID that has been collected incorrectly; provides a confidence level to weigh the observed against expected trailer IDs when the observed trailer ID does not match an expected trailer ID (e.g., within yard inventory 122); provides an interpretation of proximity of other trailers with that share similar IDs to the observed trailer ID (e.g., is it likely the trailer is just one spot out of place); determines the most likely trailer ID alternative based on character visual similarity; and so on. By sharing the information across multiple tractors 104, each tractor 104 builds on this approach by having more data points for consideration.

In this context, holistic refers to a level of data interpretation, where different features are weighted differently based on the scenario, that sits on top of the empirical data gathered.

In certain embodiments, machine learning model 274 may be implemented within cloud 350, for example as a service of mission control 102. Accordingly, inventory module 270 sends images 272 to image store 352 and sends a message 160 to instruct mission control 102 to invoke machine learning model 274. Mission control 102 would them determine whether to invoke human interface 354 or not based on confidence level 324 returned by machine learning model 274.

Figure 3:
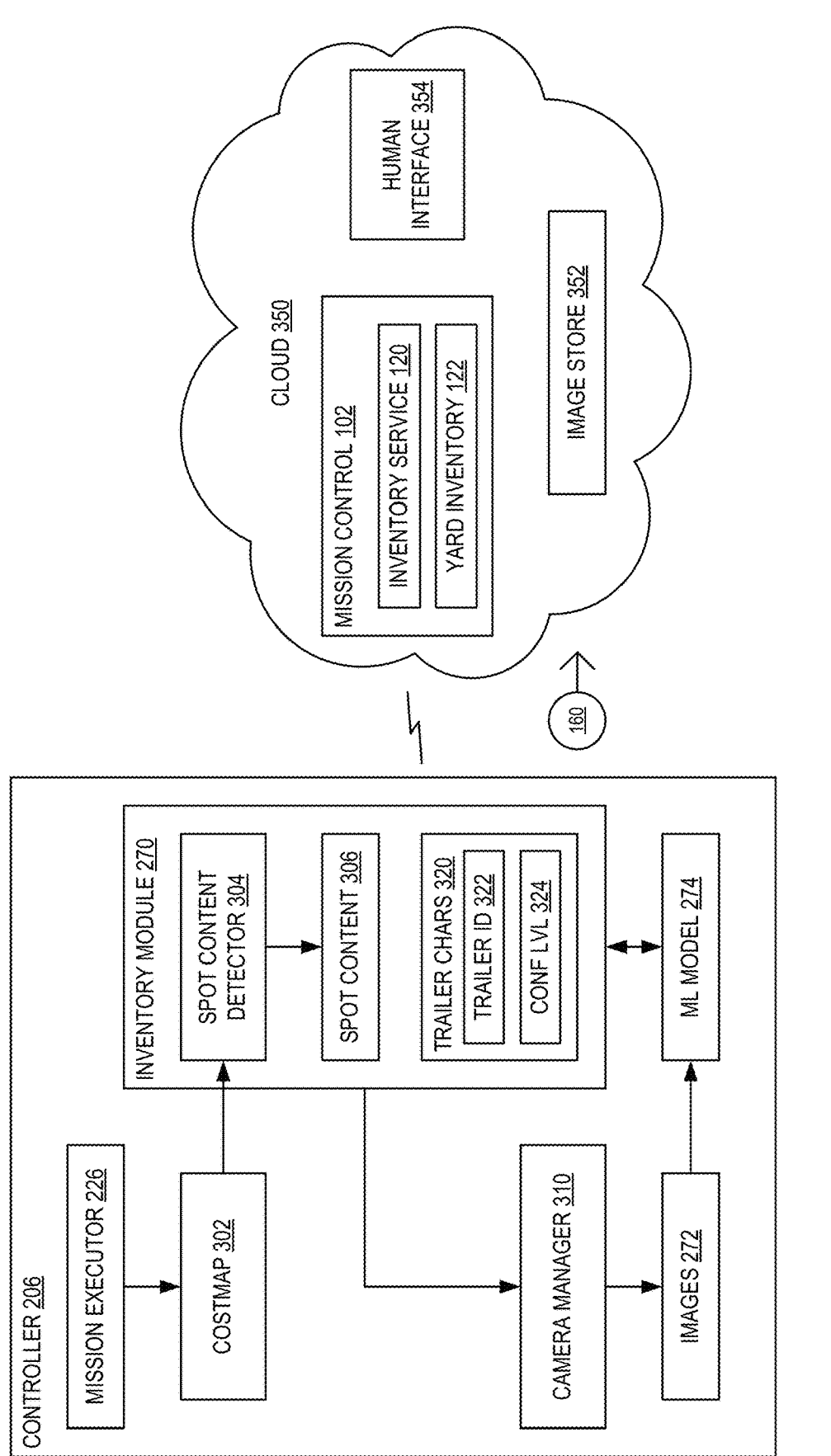
FIG. 3 is a schematic diagram illustrating example yard inventory architecture of autonomous yard inventory system of FIG. 1, in embodiments.

FIG. 3 is a schematic diagram illustrating example yard inventory architecture 300 of autonomous yard inventory system 100 of FIG. 1, in embodiments. Yard inventory architecture 300 illustrates functionality performed by controller 206 of tractor 104 and functionality performed by mission control 102 within cloud 350. When operating in passive or active mode, controller 206 communicates with mission control 102 to update yard inventory 122 based on whether trailers 106 are detected in parking spots 112 and trailer characteristics 320 that may include a trailer identifier 322 and other characteristics of the trailer.

Mission executor 226 controls operation of tractor 104 and builds a costmap 302 (see FIG. 7) during maneuvering of tractor 104. For example, costmap 302 is built as tractor 104 maneuvers around yard 101 based on point cloud 221 captured by at least one LIDAR 220. Costmap 302 is also used by a spot content detector 304 to determine spot content 306 that defines occupancy of parking spot 116 (e.g., whether or not a parking spot 112 includes trailer 106). Spot content detector 304 is described in further detail below.

Inventory module 270 uses a camera manager 310 to capture images of a front end of trailer 106 and then uses machine learning model 274 to extract trailer identifier 322 from images 272 and to provide a confidence level 324 that indicates a probability that trailer identifier 322 is extracted correctly. For example, where confidence level 324 is greater than a predefined threshold (e.g., 80%) it is likely that trailer identifier 322 is captured correctly; however, where confidence level 324 is below the predefined threshold is possible that trailer identifier 322 does not reflect the identity of trailer 106 correctly. Where an identification mark of trailer 106 is dirty, or where lighting results in a poor quality image, machine learning model 274 may be unable to capture trailer identifier 322 correctly. Operation of machine learning model 274 is described in further detail below.

Mission control 102 receives inventory update messages 160 from controller 206 as inventory module 270 determines a status for each parking spot 112 passed by tractor 104, and inventory service 120 updates yard inventory 122 based on the determined status in the received messages. Cloud 350 may also include an image store 352 for storing images captured by cameras 218 of tractor 104. In certain embodiments, image store 352 is implemented as an cloud based service. That is, controller 206 uses the cloud based service to send images 272 to image store 352 where they may be accessed by mission control 102 and other components of yard inventory architecture 300 through the cloud based service.

Where confidence level 324 is low (e.g., less than the predefined threshold), inventory module 270 sends corresponding images 272 to image store 352 and message 160 to mission control 102. Inventory service 120 determines that confidence level 324 in message 160 is low and invokes a human interface 354 that uses a person to review one or more of images 272 and corresponding trailer characteristics 320 and provide trailer identifier 322. That is, the person may look at the one or more images 272 and trailer characteristics 320 to evaluate markings of the trailer and then provide trailer identifier 322 as discerned therefrom. The discerned trailer identifier 322 may be used to further train machine learning model 274, which thereby improves in performance over time.

Figure 4:
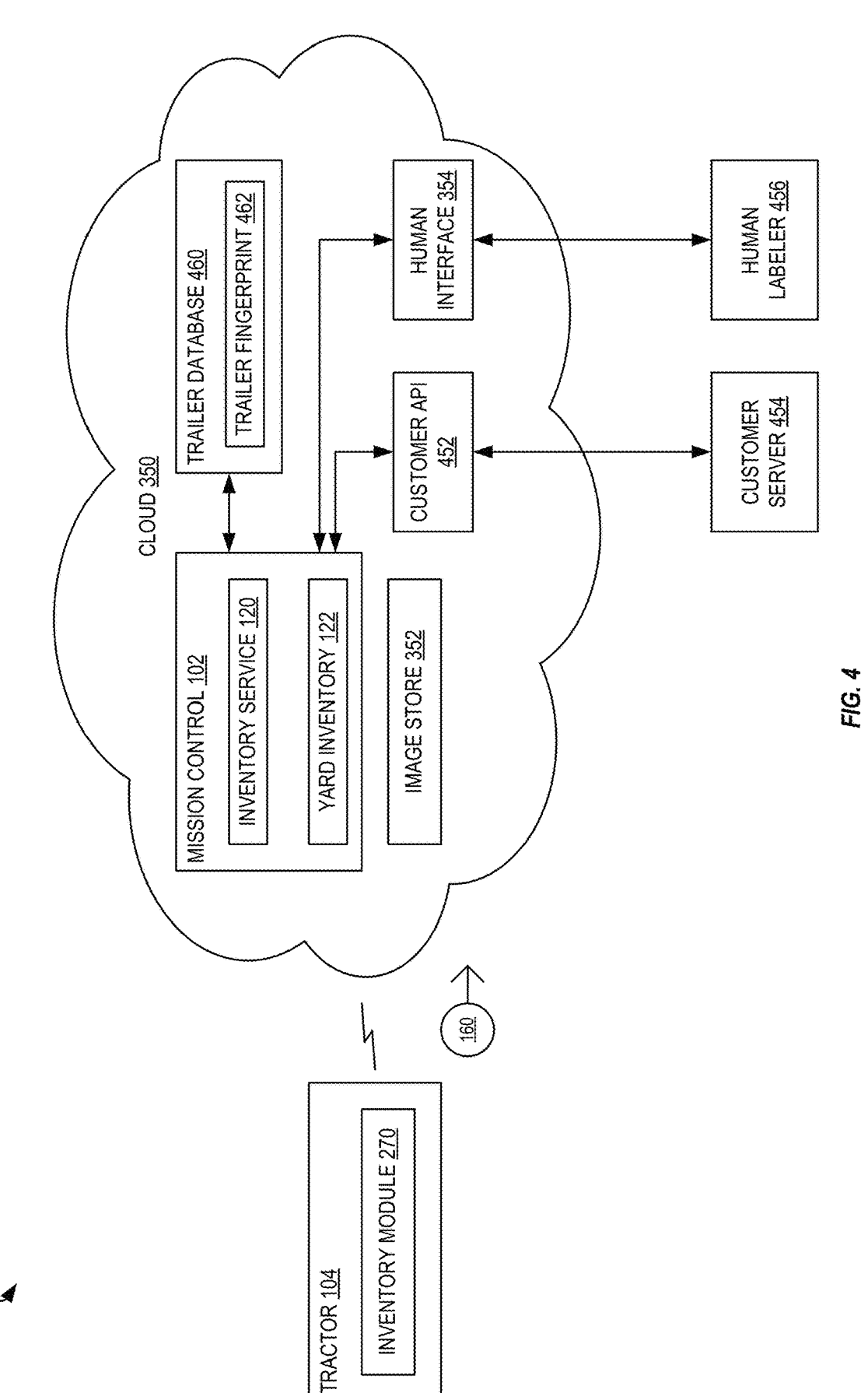
FIG. 4 is a block diagram illustrating the yard inventory architecture of FIG. 3 in further example detail, in embodiments.

FIG. 4 is a block diagram illustrating yard inventory architecture 300 of FIG. 3 in further example detail, in embodiments. Within cloud 350, inventory service 120 interacts with human interface 354 to resolve trailer identifier 322 when confidence level 324 is below the predefined threshold. In this example, confidence level 324 displays images 272 to a human labeler 456, who provides trailer identifier 322 in response, where possible. Human labeler 456 may indicate a non-resolution result when human labeler 456 is unable to resolve trailer identifier 322 from images 272.

Inventory service 120 also implements a customer application programming interface (API) 452 that interacts with a customer server 454 (e.g., a customer's server that maintains an independent trailer inventory). Customer server 454 may provide updates to yard inventory 122 or to characteristics of the trailer via customer API 452, and inventory service 120 may send updates of yard inventory 122 and/or detected trailer characteristics to customer server 454. Inventory service 120 may store characteristics of identified trailers within a trailer database 460. For example, trailer database 460 may defined one or more of: trailer type, trailer length, gladhand type, gladhand position, and so on. Trailer database 460 is described in further detail below.

Interpretation of Physical Space in a Yard

The essence of automated yard inventory is that accurate updates to a customer's database are made by meaningful interpretation of data collected in the physical space of the yard such that the data may be relates to information in the customer's database.

A first step in deploying automated vehicles in yard 101 is to creates a map of physical features in yard 101, particularly parking spots 112 (a delineated geolocation on the yard where an immobile trailer may be housed, typically in a parking area or at a dock door). An initial map (digital or physical, usually a CAD drawing of some sort) may be provided by a customer. This map is then used, in conjunction with visible markings physically in the yard, to associate each spot in the map with one in the physical yard. Once this association is made, the map is further populated with geographic location data (e.g., GPS coordinates) of points of interest (POIs) within the yard to map (e.g., four data points for each parking and dock spot polygon or boundaries) this physical space virtually in the a priori space, such as a virtual representation of the yard 101 that is usable by tractors 104 operating within yard 101. Each spot is assigned a unique ID. Accordingly, tractor 104 understands and is localized to physical locations and features of yard 101. The a priori space also includes an understanding of Autonomous Operating Zones (AOZs), No-Go areas, labeled parking spots 112 (including loading docks), routes, and other map data each tractor 104 uses to navigate yard 101.

Within each tractor 104, a determined current location and orientation is combined with data from perception equipment to relate the data being collected to the a priori space. Accordingly, tractor 104 may determine a parking spot identifier for a parking spot 112 based on the geolocation. Thus tractor 104 associates data collected but its sensors with the physical space to make inferences about the physical space and the obstacles, objects, and actors inside it.

Such actors and objects include trailers 106 in parking spot 112, both physically within yard 101 and as stored in yard inventory 122. Accordingly, the map and defined virtual space allows tractor 104 to make inferences about inventory; determining, based on yard inventory 122 and perception data, whether a trailer occupies parking spot 112 and its trailer identifier 322. When parking spot 112 is determines as empty, no images of trailer IDs are sent for interpretation. When parking spot 112 is determines as occupied, captured images of the trailer (e.g., the trailer ID) are sent for interpretation. When, based on its determined location (e.g., GPS data) with reference to the map, it determines that it is not near any parking spots, tractor 104 does not collect inventory data. When, based on its determined location (e.g., GPS data) with reference to the map, it determines that it is passing a parking spot, and may automatically collect inventory data, though it is not required.

Imaging Trailer in Parking Spot

Figure 5:
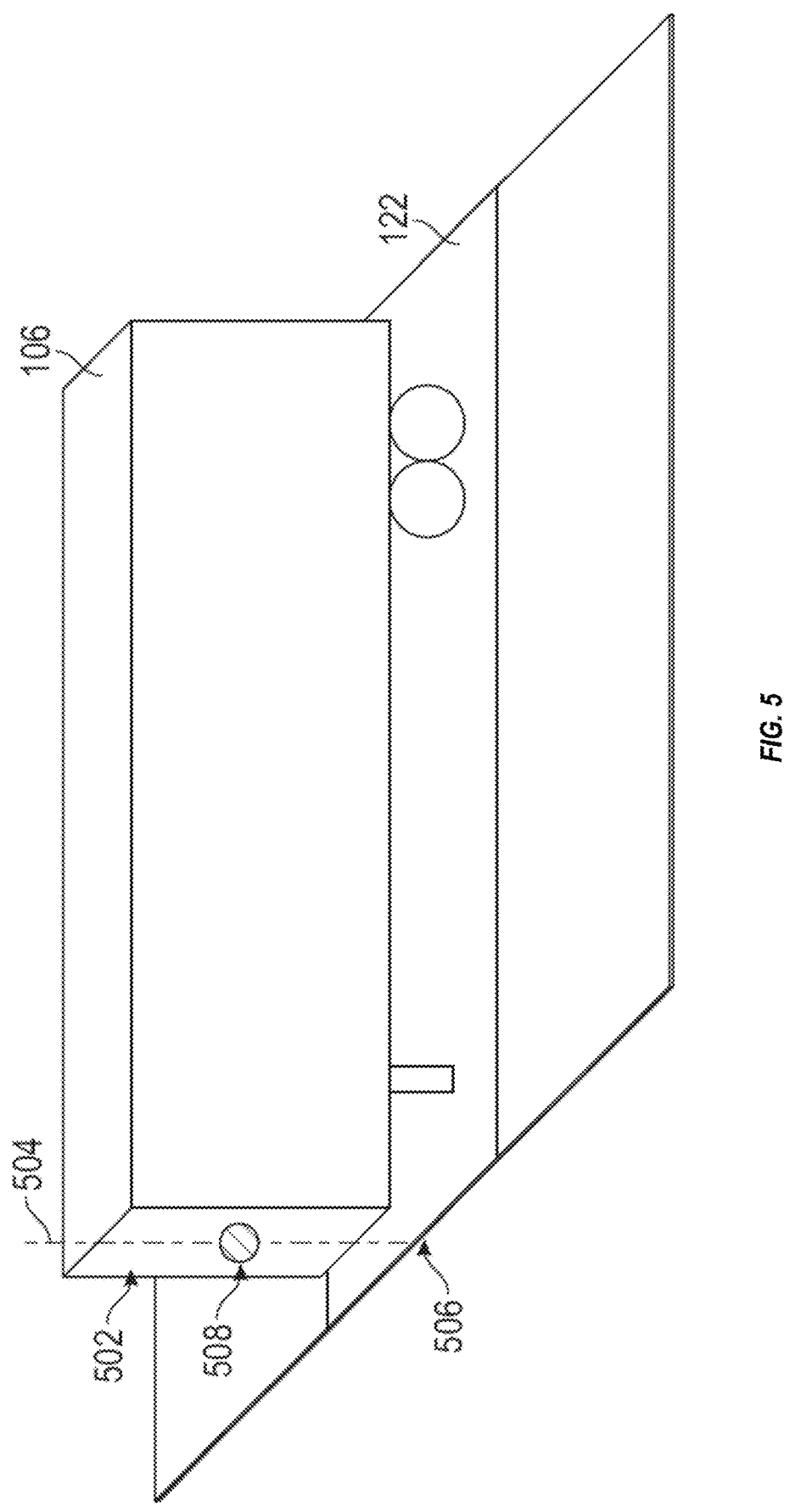
FIG. 5 is a perspective view of a trailer parked in a parking spot illustrating example references that facilitate capture of images of a front face of the trailer, in embodiments.

FIG. 5 is a perspective view of trailer 106 of FIG. 1 parked in parking spot 112 illustrating example references that facilitate capture of images 272 of a front face 502 of trailer 106, in embodiments.

One of the main technical challenges in autonomous yard inventory is collecting useful images of parking spot 112 using the variety of cameras 218 of tractor 104, since each camera 218 provides one of a variety of views from tractor 104. To consistently detect trailer characteristics 320 of trailer 106 parked in parking spot 112, for use by either machine learning model 274 or a human, images 272 should consistently capture front face 502 irrespective of which parking spot 112 is being evaluated.

The following calculations are performed just once (e.g., during initialization when controller 206 powers on) to determine the necessary data about each parking spot 112 within yard 101.

For each parking spot 112 in yard 101, a spot point-of-interest (POI) 508 is calculated. Spot POI 508 is a defined 3D location that is used to determine when images from one or more cameras 218 are usable by inventory module 270. As shown in FIG. 5, spot POI 508 is on a vertical line 504 positioned midway along a front edge 506 (e.g., entrance) of parking spot 112 and at a position at a height above ground along vertical line 504 that is vertically centered on the front face of an average height trailer. In other words, spot POI 508 is a point that is centered (both horizontally and vertically) on front face 502 of trailer 106 when it is parked up against front edge 506 of parking spot 112, as shown in FIG. 5.

One goal for capturing images 272 of a trailer positioned withing parking spot 112 is that corresponding spot POI 508 is most centered (e.g., closest to the center of the image after projecting the POI into the image). Accordingly, inventory module 270 controls camera manager 310 to stores images 272 when spot POI 508 is nearest a projected center line of cameras 218 as tractor 104 moves past parking spots 112.
Image Selection Inventory module 270 performs the following calculations twice per second (e.g., 2 Hz) to determine when images 272 are cached and sent to machine learning model 274 and/or to human interface 354. Accordingly, as tractor 104 passes each parking spot 112, inventory module 270 controls camera manager 310 to capture and store images from cameras 218 that includes spot POI 508

Figure 6:
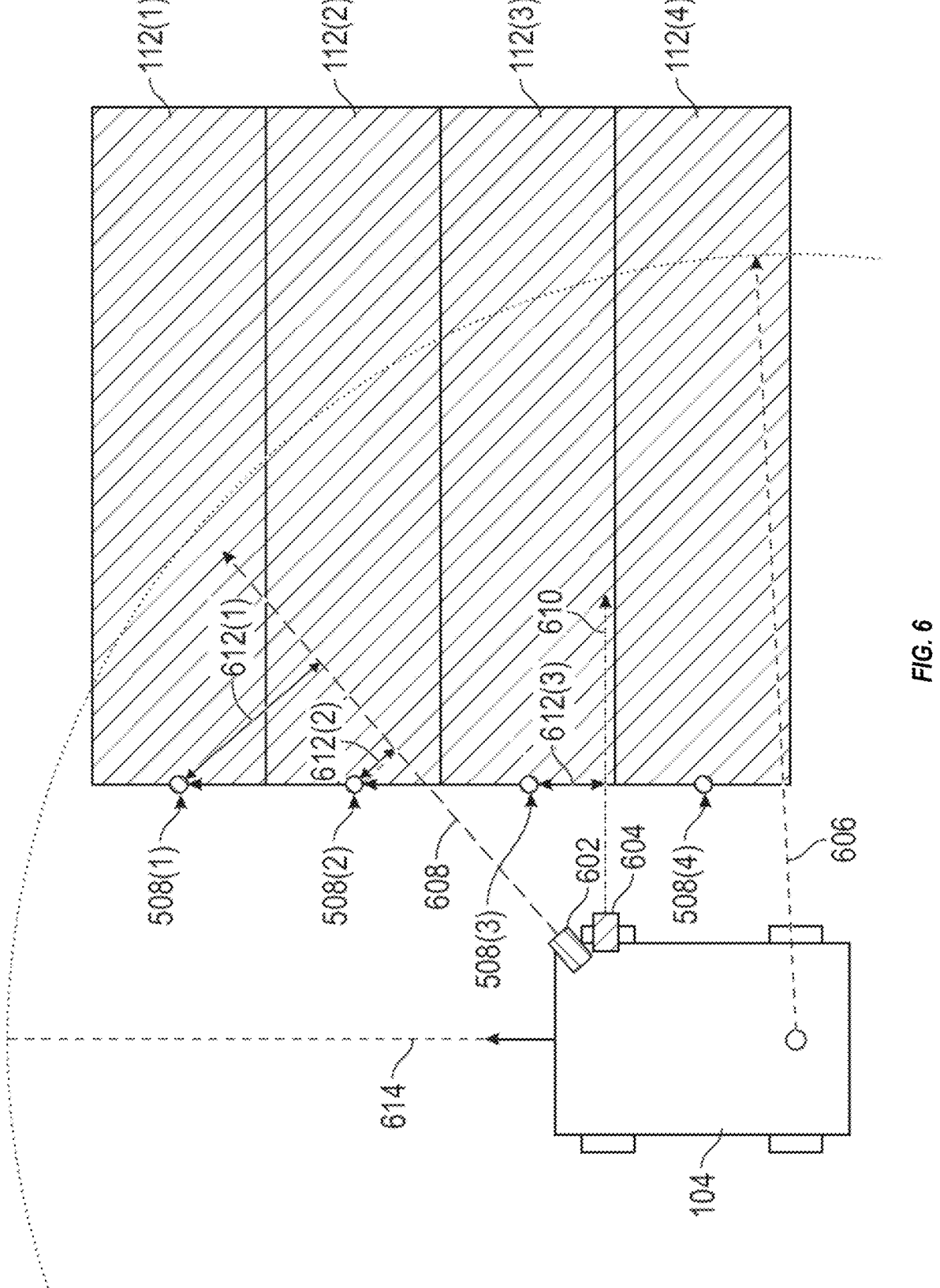
FIG. 6 is a schematic diagram illustrating the tractor of FIG. 1 passing four parking spots and determining when the inventory module of FIG. 2 should capture images for determining a trailer identifier of a trailer in each parking spot, in embodiments.

FIG. 6 is a schematic diagram illustrating tractor 104 of FIG. 1 passing four parking spots 112(1)-(4) to determine when inventory module 270 of FIG. 2 should capture images 272 for determining trailer identifier 322 of a trailer in each parking spot 112, in embodiments. In this example, tractor 104 is following a path 614 and has a front right camera 602 and a right center camera 604. Although path 614 is shows as a straight line, path 614 may be curved without departing from the scope hereof. Cameras 602 and 604 are mounted on a front right side of tractor 104 (e.g., on "sensor bar" mounted at the top front of the cab). Camera 602 is pointed forward at a forty-five degree angle relative to the forward direction of tractor 104, and camera 604 is pointed at ninety-degrees to the forward direction of tractor 104. Camera 602 has a "normal" field of view (e.g., 120°) with low distortion. Camera 604 may have a wider field of view (e.g., 190°—a fish-eye lens) that results in more distortion than images from camera 602, but includes more of the environment in its field of view.

Using a smaller FOV camera paired with a large FOV camera provides a more complete and useful set of images from tractor 104. The smaller FOV provides more resolution with a clearer view of a smaller area of space. Although, in situations where camera 602 fails to capture the trailer ID in its images, camera 604 likely provides includes the trailer ID in its captured images.

Inventory module 270 first determines which previously determined spot POIs 508 are within a spot search radius 606 (e.g., twenty meters) from tractor 104, identifying a group of parking spots 112 corresponding to spot POIs 508(1)-(4) in this example. Only spot POIs 508(1)-(4) (e.g., within spot search radius 606) are considered in the following steps.

For each spot POIs 508(1)-(4), distances 612(1)-(4) between the spot POI and a central axis 608, 610 of each camera 602, 604, respectively, is calculated. Not all distances are shown for clarity of illustration. Distance 612 represents how well centered spot POI 508 is in an image captured by the corresponding camera 602, 604. Central axis 608, 610 are projection lines that originate from a center of the camera lens outward in a direction the image is taken through a center of the field of view. In other words, central axis 608, 610 is a projection from the camera aligned to a center of an image captured by the camera.

Where distance 612 is either (a) first calculated for that spot POI and camera pair or (b) is smaller than a previously stored distance 612, distance 612 and the corresponding image 272 captured by the camera at that instance are stored as the current best value and image for that spot POI. For example, the images 272 are stored within a temporary cache of memory 210. In the example of FIG. 6, for the illustrated position of tractor 104, distance 612(1) is from spot POI 508(1) to central axis 608 of camera 602, distance 612(2) is from spot POI 508(2) to central axis 608, and distance 612(3) is from spot POI 508(3) to central axis 610 of camera 604.

Once tractor 104 has passed a particular parking spot 112 and a determination as to whether the parking spot is occupied has been made by spot content detector 304 (e.g., described below with reference to FIGS. 7 and 8), best images 272 captured by each camera 602, 604 for that parking spot 112 may be retrieved from the cache in memory 210 and used to determine trailer identifier 322 of trailer 106 parked in that parking spot 112. Further, when machine learning model 274 returns a low confidence level 324, images corresponding to spot POI 508 and parking spot 112 are retrieved from the cache in memory 210 and sent to human interface 354.
Empty Spot Detection Spot content detector 304 is an algorithm that provides a high level sense of whether parking spot 112, being passed by tractor 104, is either empty or occupied by a trailer. This high level empty or occupied information is used by inventory module 270 to determine whether captured images of parking spot 112 may be used to determine trailer identifier 322. If parking spot 112 is "empty", inventory module 270 sends message 160 to mission control 102 to update yard inventory 122 as needed. However, when parking spot 112 is occupied, captured images of parking spot 112 may be used to determine trailer identifier 322.

Figure 7:
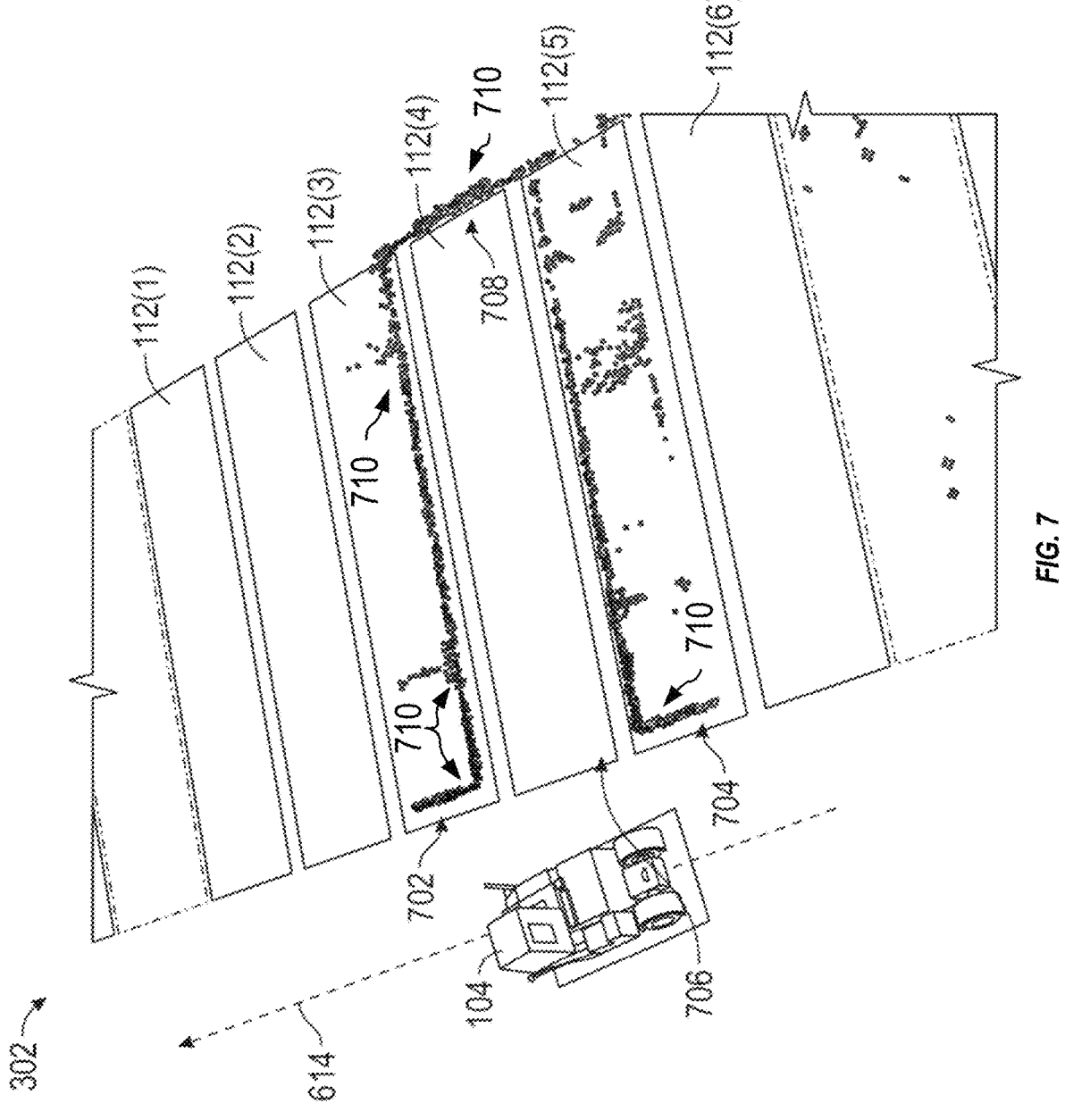
FIG. 7 is a perspective schematic illustrating the costmap of FIG. 3 generated by the tractor of FIG. 1 for nearby parking spots, in embodiments.

FIG. 7 is a perspective schematic illustrating costmap 302 of FIG. 3 generated by tractor 104 of FIG. 1 for nearby parking spots 112(3)-(5), in embodiments. Costmap 302 is a 2D grid planar to the ground of yard 101, where each element of the grid is shown as a small square ranging in color from black to white when LIDAR 220 detects an object at that point in space. Costmap 302 is effectively point cloud 221 projected onto the 2D grid. For clarity of illustration, tractor 104 is shown relative to parking spots 112(1)-(6) marked as rectangles; however, tractor 104 and rectangles are not included within costmap 302. However, costmap 302 is a scaled representation of yard 101 such that data within costmap 302 may be related to parking spots 112.

As described above, point cloud 221 is captured by LIDAR 220 as tractor 104 maneuvers around yard 101 and costmap 302 is populated there from. In the example of FIG. 7, costmap 302 includes occupied squares 710 near a front edge 702 of a defined rectangle of parking spot 112(3) indicating that parking spot 112(3) likely includes a trailer. Similarly, it is likely that parking spot 112(5) includes a trailer since costmap 302 includes occupied squares 710 near front edge 704 of its defining rectangle. Conversely, there is likely no trailer in parking spot 112(4) since costmap 302 shows no occupied squares near front edge 706 of, or within, its defining rectangle. Costmap 302 shows occupied squares 710 outside a rear edge 708 of the defining rectangle of parking spot 112(4) that likely result from detection of a dock wall by LIDAR 220.

Figure 8:
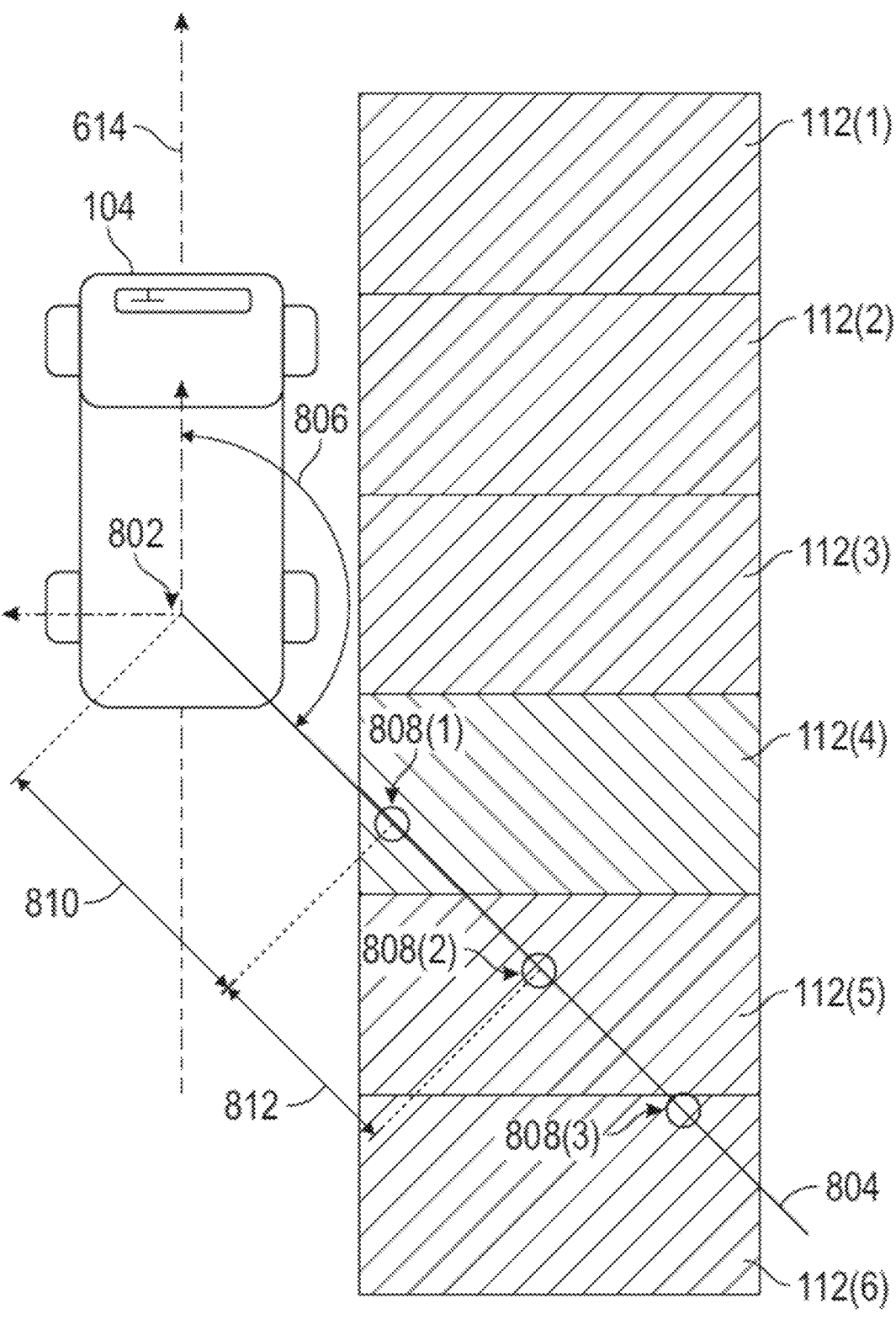
FIG. 8 is a plan view schematic illustrating example operation of the spot content detector of FIG. 3 as the tractor of FIG. 1 continues to follow the path of FIG. 6, in embodiments.

FIG. 8 is a plan view schematic illustrating example operation of spot content detector 304 of FIG. 3 as tractor 104 continues to follow path 614 of FIG. 6, in embodiments. Spot content detector 304 runs at intervals (e.g., once per second—1 Hz) to identify one parking spot 112 for evaluation as to whether it is occupied or empty. Particularly, spot content detector 304 identifies one parking spot 112 already passed by tractor 104 such that data from LIDAR 220 has been collected as point cloud 221 and imported into costmap 302. For the given poise of tractor 104 in FIG. 8, costmap 302 is still being constructed for parking spots 112(1)-(3) and thus evaluation of costmap 302 for these parking spots 112 is less useful. However, since tractor 104 has passed parking spot 112(4), LIDAR 220 has scanned parking spot 112(4) and costmap 302 is substantially complete for parking spot 112(4). The following algorithm is implemented by spot content detector 304 to identify a parking spot 112 for which costmap 302 is substantially complete.

A base-link 802 of tractor 104 is defined as a point at ground level directly below a center of the rear axle of tractor 104, and may be derived from a geographic location and orientation (e.g., a current poise) of tractor 104. Spot content detector 304 projects a projection line 804 radiating from base-link 802 at a scan line angle 806 relative to the front of tractor 104. Scan line angle 806 may be defined in a configuration file and thereby tuned to adjust performance of spot content detector 304. In one embodiment, scan line angle 806 has a default value of 110°.

Spot content detector 304 then iteratively generates scan points 808(1)-808(3) along projection line 804, where scan point 808(1) is at first point distance 810 from base-link 802, scan point 808(2) is an interpoint distance 812 further along projection line 804 from scan point 808(1), scan point 808(3) is interpoint distance 812 further along projection line 804 from scan point 808(2), and so on. First point distance 810 and interpoint distance 812 may be defined in the configuration file. First point distance 810 has a default value of 5 meters for example, but may be changed to adjust performance of spot content detector 304. Interpoint distance 812 has a default value of 3 meters for example, but may be changes to adjust performance of spot content detector 304. Although shown with three scan points 808 (1)-808(3), spot content detector 304 may generate additional scan points 808 along projection line 804 spaced by interpoint distance 812.

In one example of operation, spot content detector 304 generates scan point 808(1) and determines whether the geographic location of scan point 808(1) is within a rectangle of any parking spot 112 (e.g., as defined by the map of yard 101). When spot content detector 304 determines that scan point 808(1) is not within a rectangle of any parking spot 112, spot content detector 304 generates scan point 808(2) and determined whether its geographic location falls within a rectangle of any parking spot 112. When spot content detector 304 determines that scan point 808(2) is not within a rectangle of any parking spot 112, spot content detector 304 generates scan point 808(3) and determines whether the geographic location of three scan points 808(3) falls within a rectangle of any parking spot 112, and so on until the latest scan point falls within a rectangle of parking spot 112. In the example of FIG. 8, spot content detector 304 determines that scan point 808(1) falls within parking spot 112(4), and further points are not generated (although shown to illustrate the algorithm). As noted above, spot content detector 304 is not invoked unless tractor 104 is near at least one parking spot 112.

When spot content detector 304 identifies a parking spot (e.g., parking spot 112(4) in this example), spot content detector 304 then evaluates the portion of costmap 302 corresponding to the rectangle of parking spot 112(4) to determine whether parking spot 112(4) is occupied or empty. In the example of FIG. 7, parking spot 112(4) is empty.

Spot content detector 304 may process costmap 302 to determine a number of occupied squares within the rectangle of parking spot 112(4) and compare the number to a predefined threshold, which may be defines within the configuration file to allow modification of the performance of spot content detector 304. When the number is greater than the threshold, spot content detector 304 determines that the parking spot is occupied, and when the number is less than the threshold then spot content detector 304 determines that the parking spot is empty.

Inventory module 270 uses the determination of whether the parking spot is occupied or empty when sending the captured images 272 to machine learning model 274, as described above. That is, inventory module 270 does not invoke machine learning model 274 with corresponding images 272 of parking spot 112 until spot content detector 304 determines that the parking spot is occupied.

UI and Data Storage Updates

Capturing images of parking spots and determining occupancy of the parking spots operate independently (e.g., asynchronous). For example, cameras 218 may capture images of parking spots that are ahead of tractor 104, whereas costmap 302 may not be fully populated until tractor 104 has passed the parking spot.

In certain embodiments, trailer characteristics 320 collected by inventory module 270 and spot content detector 304 may additionally include one or more of the following, but not limiting, information: time of update, additional images of trailer 106 such as face and/or sides, other trailer data such as trailer length and trailer type, gladhand type classification which may be used to facilitate and optimize service line connections to the trailer by reducing time needed for pose estimation or gladhand assessment during the mission, an assessment of service line connectivity likelihood or damage based on the gladhand(s), an assessment of trailer connectivity likelihood or damage based on the trailer state, a dock light status (red, green, non-functional), and other detectable features of the trailer such as scratches, dents, rivets, etc.

Trailer characteristics 320 may be included in messages 160 sent from controller 206 of tractor 104 to mission control 102, whereby mission control 102 stores this additional information either in yard inventory 122 and/or trailer database 460. Particularly, trailer database 460 may be maintained for trailers that are not part of yard inventory 122. That is, even when trailer 106 leaves yard 101, characteristics of trailer 106 is maintained within trailer database 460. Further, characteristics of trailer 106 may be received, from customer server 454 via customer API 452 for example, prior to trailer 106 arriving at yard 101. Inventory service 120 may process trailer characteristics (e.g., metadata) from trailer database 460 and corresponding images 272 within image store 352 to form a trailer fingerprint 462. Trailer fingerprint 462 is a single datapoint that identifies a particular trailer, and allows the trailer to be identified even when its trailer ID cannot be determined. For example, trailer fingerprint 462 may allow identification of trailer 106 based on trailer type, trailer length and distinguishing marks such as scratches or other damage, rivets, repairs, and so on.

Figure 9:
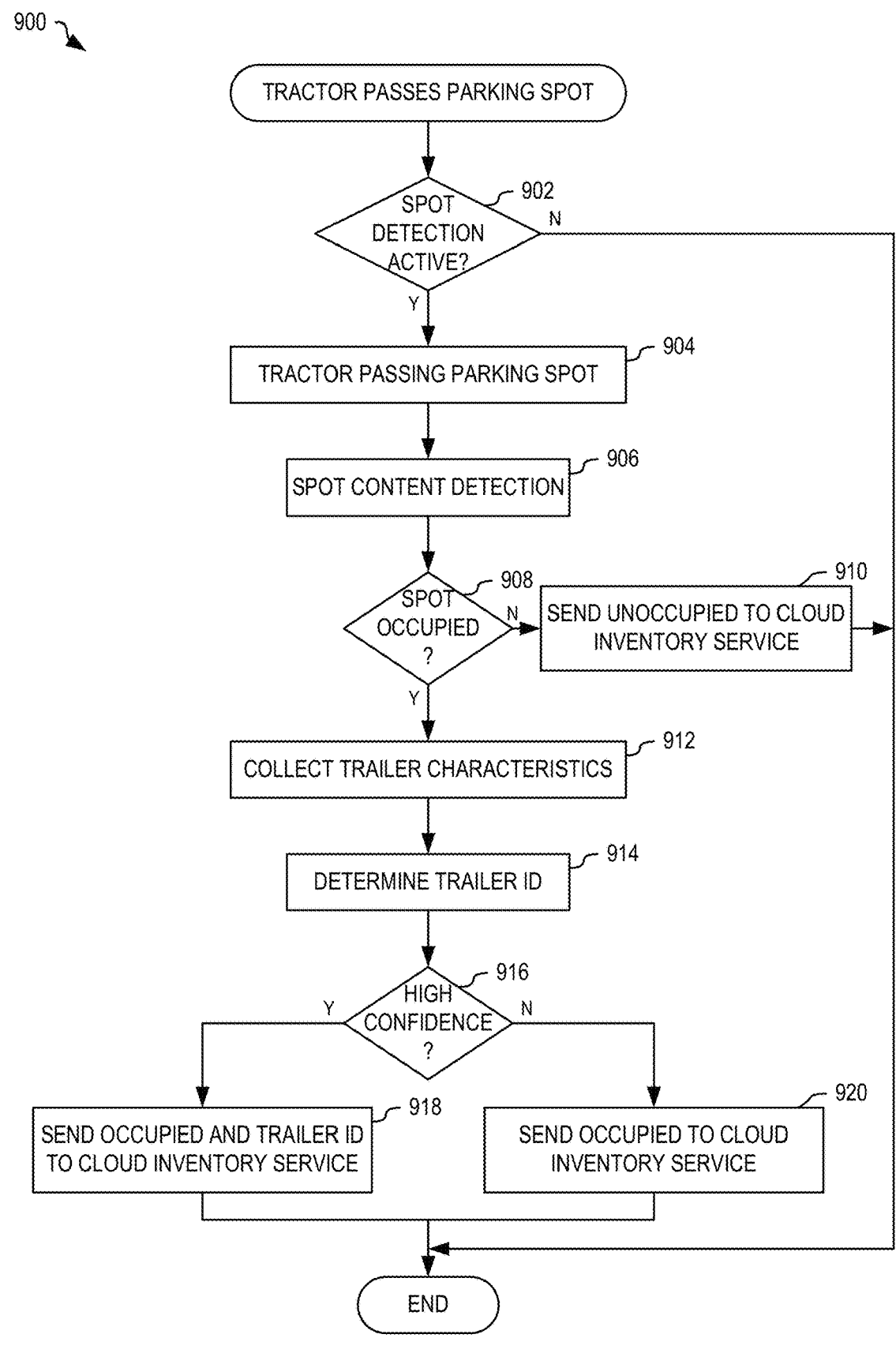
FIG. 9 is a flowchart illustrating one example method for automated yard inventory implemented within the tractor of FIG. 1, in embodiments.

FIG. 9 is a flowchart illustrating one example method 900 for automated yard inventory, in embodiments. Method 900 is implemented in controller 206 of tractor 104 for example.

Block 902 is a decision. If, in block 902, method 900 determines that spot detection and autonomous yard inventory is active, method 900 continues with block 904; otherwise method 900 terminates. For example, at certain times, it may be unnecessary for autonomous yard inventory to operate, wherein during maneuvering of tractor 104 controller 206 takes no action to detect trailers 106 within parking spots 112 or determine trailer identifier 322.

In block 904, method 900 determines that the tractor is passing a parking spot. In one example of block 904, inventory module 270 uses spot search radius 606 to determine that tractor 104 is passing parking spots 112(1)-(4) (e.g., see FIG. 6). In block 906, method 900 performs spot content detection. In one example of block 906, inventory module 270 invokes spot content detector 304 to determine whether parking spot 112 is occupied or is empty.

Block 908 is a decision. If, in block 908, method 900 determines that the sparking spot is occupied, method 900 continues with block 912; otherwise, method 900 continues with block 910.

In block 910, method 900 sends a message indicating the parking spot is unoccupied to the cloud inventory service. in one example of block 910, inventory module 270 causes controller 206 to send message 160 to inventory service 120 of mission control 102 in cloud 350. Method 900 then terminates.

In block 912. method 900 collects trailer characteristics. In one example of block 912, inventory module 270 instructs camera manager 310 to capture at least one image 272 of parking spot 112 using one or more cameras 218 of tractor 104 as tractor 104 passes parking spot 112. In block 914, method 900 determines the trailer ID. In one example of block 914, inventory module 270 invokes machine learning model 274 to process images 272 and determine trailer identifier 322.

Block 916 is a decision. If, in block 916, method 900 determines that the trailer ID has a high confidence, method 900 continues with block 918; otherwise, method 900 continues with block 920.

In block 918, method 900 sends occupied and trailer ID to the cloud inventory service. In one example of block 918, inventory module 270 causes controller 206 to send message 160 containing trailer characteristics 320 and an occupied status to inventory service 120 of mission control 102 in cloud 350. Method 900 then terminates.

In block 920, method 900 sends occupied to the cloud inventory service. In one example of block 920, inventory module 270 causes controller 206 to send message 160 containing an occupied status and indicating that the trailer ID could not be detected to inventory service 120 of mission control 102 in cloud 350. Method 900 then terminates.

Figure 10:
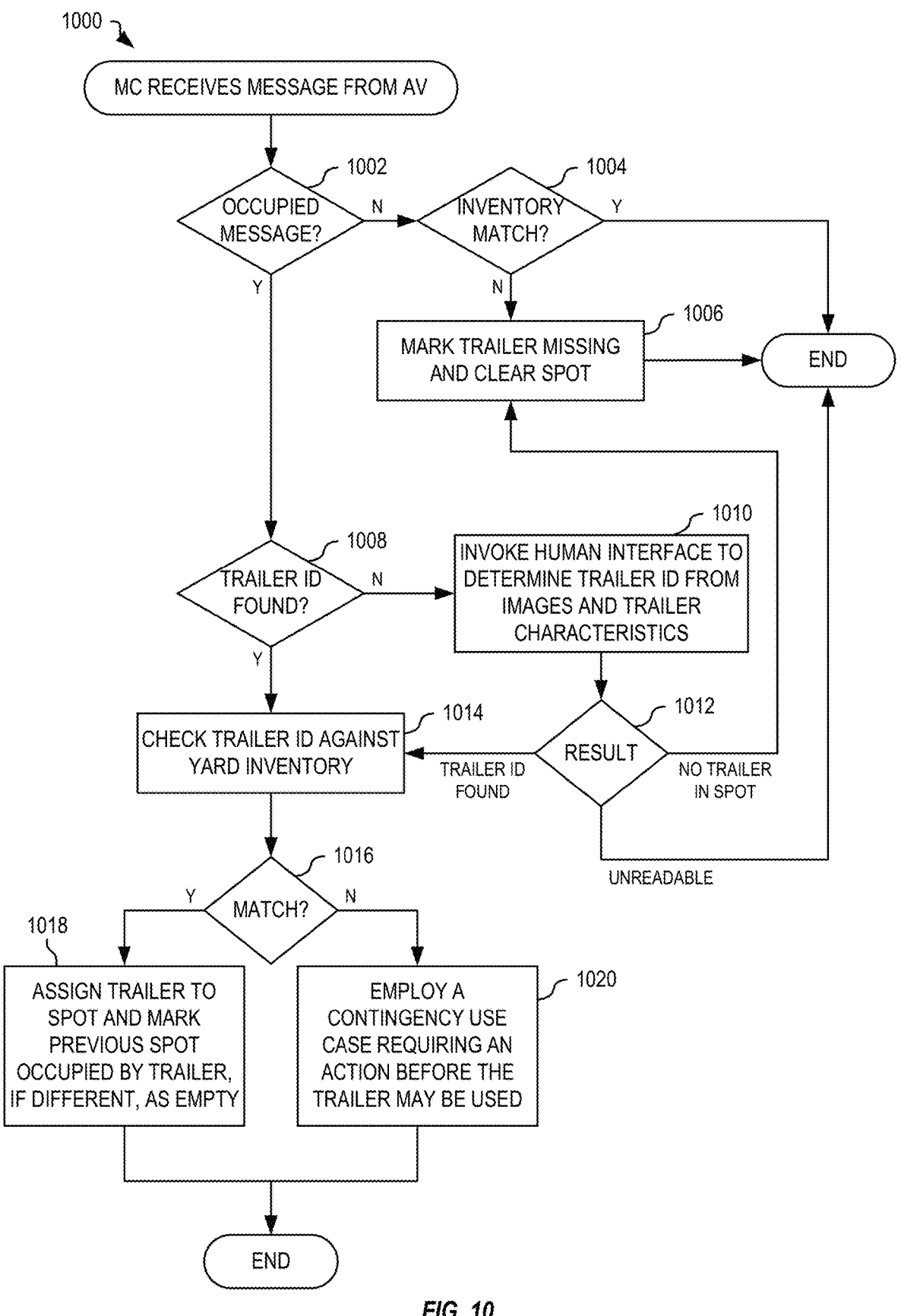
FIG. 10 is a flowchart illustrating one example method for automated yard inventory implemented within the inventory service of FIG. 1, in embodiments.

FIG. 10 is a flowchart illustrating one example method 1000 for automated yard inventory, in embodiments. Method 1000 is implemented in inventory service 120 of mission control 102 in cloud 350 for example.

Block 1002 is a decision. If, in block 1002, method 1000 determines that the message indicates the parking spot is occupied, method 1000 continues with block 1008; otherwise, method 1000 continues with block 1004.

Block 1004 is a decision. If, in block 1004, method 1000 determines that the inventory matches, method 1000 terminates without inventory change; otherwise, method 1000 continues with block 1006. In one example of block 1004, inventory service 120 determines whether yard inventory 122 already indicates parking spot 112 is empty such that no change is required.

In block 1006, method 1000 marks the trailer as missing and clears the spot. Method 1000 then terminates. In one example of block 1006, inventory service 120 updates yard inventory 122 to indicate trailer 106 indicated as being in parking spot 112 is missing and marks parking spot 112 as empty.

Block 1008 is a decision. If, in block 1008, method 1000 determines that the received message includes a trailer ID, then method 1000 continues with block 1014; otherwise, method 1000 continues with block 1010.

In block 1010, method 1000 invokes the human interface to determine the trailer ID from images and trailer characteristics corresponding to the identifier parking spot. In one example of block 1010, inventory service 120 invokes human interface 354 to interact with human labeler 456 to determine trailer identifier 322 from images 272 corresponding to parking spot 112.

Block 1012 is a decision. If, in block 1012, method 1000 determines that the result from the human interface indicates there is no trailer in the parking spot, method 1000 continues with block 1006; if method 1000 determines that the result from the human interface indicates the trailer ID is unreadable, method 1000 terminates without change; and if 1000 determines that the result from the human interface provides the trailer ID, method 1000 continues with block 1014.

In block 1014, method 1000 checks whether the trailer ID against the yard inventory. In one example of block 1014, inventory service 120 compares trailer identifier 322 against a trailer identifier defined for parking spot 112 in yard inventory 122.

Block 1016 is a decision. If, in block 1016, method 1000 determines that the trailer ID sufficiently matches the yard inventory, method 1000 continues with block 1018; otherwise, method 1000 continues with block 1020.

In block 1018, method 1000 assigns the trailer to the spot and marks the precious spot occupied by the trailer, if different, as empty. Method 1000 then terminates. In one example of block 1018, inventory service 120 updates yard inventory 122 to assign trailer identifier 322 to parking spot 112 and to clear a parking spot previously occupied by the trailer corresponding to trailer identifier 322.

In block 1020, method 1000 employs a contingency use case requiring an action before the trailer may be used. In one example of block 1020, inventory service 120 updates yard inventory 122 to indicate that the trailer in parking spot 112 cannot be moved without human intervention to resolve the conflict in differences between trailer identifier 322 and the trailer ID defined within yard inventory 122. In another example of block 1020, a new trailer is added to the database with the known trailer characteristics.

Multi-System Inventory Data Sharing

Figure 11:
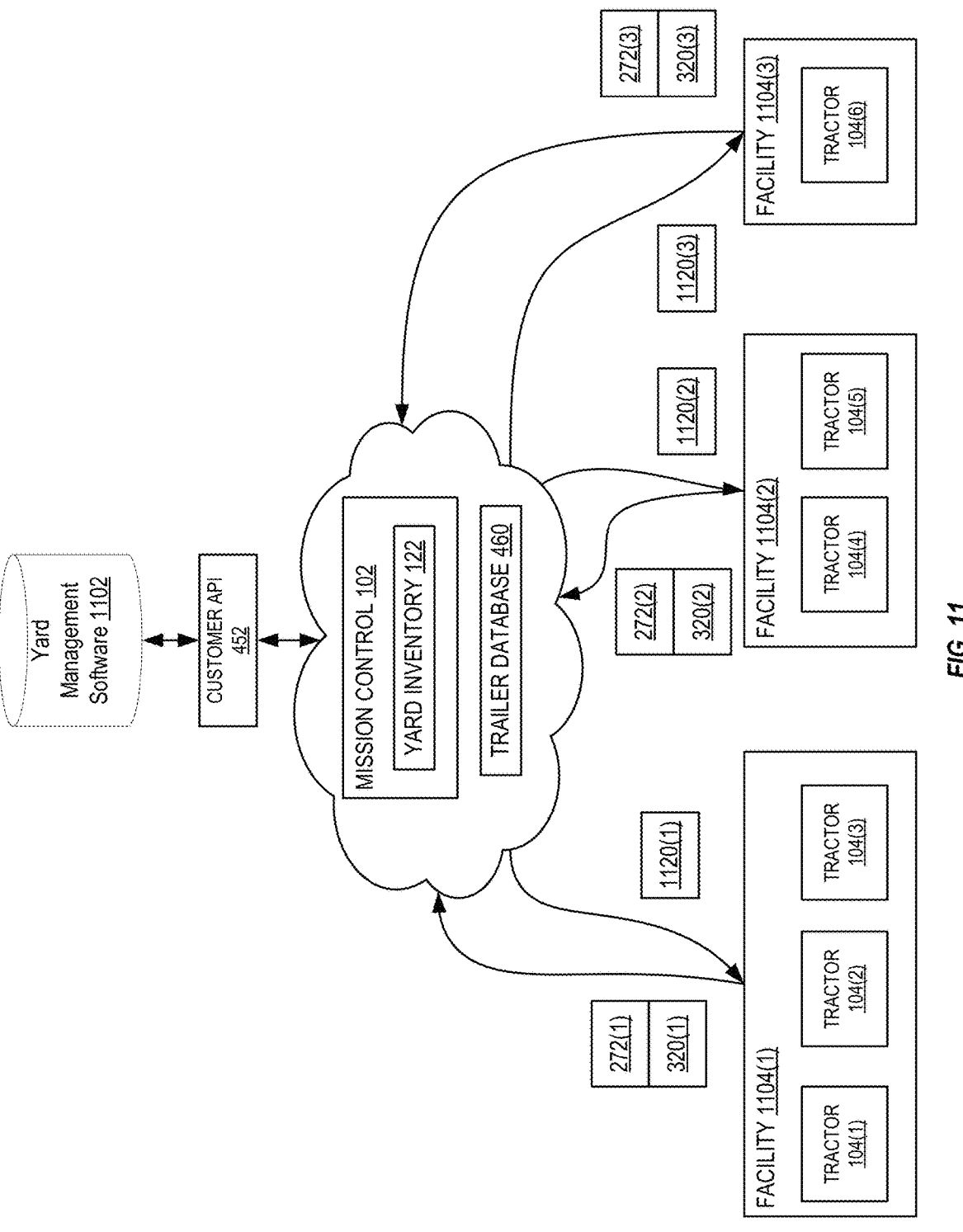
FIG. 11 is a schematic illustrating one example scenario where a customer uses yard management software to manage fleet operations of trailers in three geographically separated facilities, in embodiments.

FIG. 11 is a schematic illustrating one example scenario 1100 where a customer uses yard management software 1102 to manage fleet operations of trailers 106 in three geographically separated facilities 1104(1), 1104(2), and 1104(3) where each facility uses at least one tractor 104 to move trailers 104 at the facility and to autonomously maintain a yard inventory, in embodiments. In the example of FIG. 11, facility 1104(1) uses three tractors 104(1), 104(2), and 104(3), facility 1104(2) uses two tractors 104(4), and 104(5), and facility 1104(3) uses a single tractor 104(6). However, other numbers of tractors may be used without departing from the scope hereof. As described above, tractors 104 send images 272 and trailer characteristics 320 to mission control 102 for use by inventory service 120 to maintain yard inventory 122 for the corresponding facility 1104.

One aspect of the present embodiments includes the realization that where trailers move between common facilities, each facility would benefit from images 272 and trailer characteristics 320 captured at other facilities when identifying a newly arrived trailer 106. Where previously captured images and trailer characteristics are available, updates to yard inventory 122 may be more accurate and meaningful when previously captured images and trailer characteristics are available. That is, at any one facility 1104, trailer fingerprints 462 determined at other facilities 1104 may be advantageously used to enhance trailer identification.

Particularly, mission control 102 advantageously uses deployment of tractors 104 and inventory modules 270 across multiple facilities 1104 to capture and share trailer fingerprints 462 to allow more efficient and accurate trailer identification at any of these facilities. In the example of FIG. 11, tractors 104(1)-104(3) at facility 1104(1) pull information 1120(1) that includes trailer fingerprints 462 derived from images 272(2) and 272(3) and trailer characteristics 320(2) and 320(3), tractors 104(4) and 104(5) at facility 1104(2) pull information 1120(2) that includes trailer fingerprints 462 derived from images 272(1) and 272(3) and trailer characteristics 320(1) and 320(3), and tractor 104(6) at facility 1104(3) pulls information 1120(3) that includes trailer fingerprints 462 derived from images 272(1) and 272(2) and trailer characteristics 320(1) and 320(2).

Advantageously, mission control 102 facilitates a way of leveraging previously-collected images 272, trailer characteristics 320, and derived trailer fingerprints 462 across multiple facilities. That is, inventory module 270 may query the cloud data using an initially assessed trailer ID as a primary key in an initial search to compare the images and metadata collected on that trailer to other trailer fingerprints, to check for similarity, and to use the similarity findings to assess the confidence level of data accuracy.

The assessment of accuracy confidence levels (e.g., confidence level 324) is used to decide whether an update (e.g., via customer API 452) is made to the customer's inventory. This confidence level uses a weighted Levenshtein inventory algorithm that is applied to trailer identifier 322 and identifiers within yard inventory 122 and/or trailer database 460. Customer API 452 integrates the customer's yard management software 1102 with mission control 102 and provides a bi-directional channel of live data sharing, updates, and corrections.

In a first example scenario, tractor 104 has a mission to pick up trailer 106 at parking spot 112 which, based in yard inventory 122, is expected to contain the target trailer. However, upon arrival at parking spot 112, tractor 104 determines that parking spot 112 is not occupied by the target trailer (e.g., occupied by a different trailer, an obstacle, an actor, or is empty). Tractor 104 may then implement a search strategy based on the described automated yard inventory techniques, to find the target trailer in another parking spot. When the target trailer is located, 104 picks up the target trailer and continues executing the move to the defined destination. When the trailer is not located, tractor 104 sends message 160 to mission control 102 indicating that the target trailer is missing, whereby yard inventory 122 and the customer's yard management software 1102 is updated accordingly. Further exceptions may be handled during the mission as described below.

In a second example scenario, tractor 104 has a mission to drop trailer 106 at parking spot 112 which is indicated within yard inventory 122 as unoccupied. However, on arriving at parking spot 112, tractor 104 determines that parking spot 112 is occupied (e.g., by a trailer, an obstacle, or an actor). Tractor 104 then uses a search strategy, based on the described automated yard inventory techniques, to find a closest available empty parking spot, select that parking spot as the new destination parking spot, and continue executing the move. When the move is successful at the new destination parking spot, tractor 104 drops trailer 106 at that new destination parking spot, and sends message

160 to mission control 102 indicating that trailer 106 occupies the new destination parking spot, whereby mission control 102 updates yard inventory 122 and the customer's yard management software 1102 accordingly. If the mission is not successful, this process repeats until it is successful.

Weighted Levenshtein Trailer Updates

Levenshtein distance is a known technique for measuring a difference between two strings by counting the minimum number of "operations" on a string to modify it to match another string. For example, consider two trailer ID strings: "ABC12345" and "EBC12395". The Levenshtein distance between these two trailer ID strings is 2 since the following two operations are needed to change the first string into the second: 1: substitute the "A" for "E" "ABC12345"-> "EBC12345"; and 2: substitute the "4" for "9" "EBC12345"->"EBC12395". Inventory module 270 then calculates a percent match (e.g., confidence level 324) by normalizing the Levenshtein distance by the string length and converting it to a percent as follows:

$$percent\_match=100*(1-lev\_dist/string\_length)$$

Using the previous example, percent match is calculated as:

$$percent\_match=100*(1-2/8)=75\%$$

Within autonomous yard inventory system 100, a detected trailer identifier 322 is determined to match an entry in yard inventory 122 when confidence level 324 is above 80%. If multiple trailer identifiers 322 are matched in yard inventory 122 with confidence level 324 of >80%, inventory module 270 selects the match with the highest confidence level 324.

In one example of operation, inventory module 270 operating in tractor 104(6) captures images 272(3) of trailer 106 at facility 1104(3), and uses machine learning model 274 to determine trailer identifier 322, as described above. When an exact match (e.g., confidence level 324 at 100%) is not found within yard inventory 122 (e.g., the trailer identifier 322 is unknown in the local inventory for facility 1104(3)), mission control 102 may search for a match in trailer database 460, which in scenario 1100 includes trailers learned from all facilities 1104, to determine whether another trailer ID in the customer's inventory matches based on similar trailer characteristics (e.g., visual character similarities and location proximity), similar to a traditional Levenshtein algorithm. For example, where trailer identifier 322 is determined as "ABCDF123" but yard inventory 122 indicates that the same location has a trailer ID of ABCDE1323, inventory service 120 may determine a high confidence that the 'F' character in determined trailer identifier 322 is actually an 'E' with the bottom line obscured, perhaps by dirt or other debris.

To determine whether an inventory update is needed, inventory service 120 assesses each of: (1) occupancy status of the target parking spot (e.g., where the intended trailer is located in inventory), (2) occupancy status of the true parking spot (e.g., where the intended trailer is located physically—if different than 1.), (3) Trailer ID status (if occupied) of the target spot, (e.g., where the intended trailer is located in inventory), and (4) Spot occupancy status (if occupied) of the true spot, i.e. where the intended trailer is located physically.

The inventory parameters which play a factor in the updates made consist of the following:

Initially recorded in the Customer's YMS and found in Mission Control (Expected): the inventory which would be found in Mission Control. This could be
    a trailer with an ID
    an empty spot
Currently observed by the AV (Observed): the inventory which would be observed by the AV. This could be
    a trailer with an ID an empty spot Confidence: the degree of certainty of the ML model that its detection of the trailer characteristics is correct (trailer ID, type, length). For the purposes of this application, these can be assumed to be:

sufficient

Note: it is possible that the confidence of the ML model may be sufficiently high, but the detected ID sent to MC is still off by a "small" amount. In these cases, the cloud calculates the "percent match" of the ML model's trailer ID detection to all known IDs in the database using the Levenshtein distance algorithm in order to attempt to find a matching trailer in the database if it exists.

insufficient and the outcomes:

Update: the nature by which an update is made

The listed outcomes based on the parameters follow as such:

462 is updated, yard inventory 122 is updated based on trailer fingerprint 462, yard inventory 122 is updated based on an outcome, and yard inventory 122 is not updated based on an outcome.

In certain embodiments, inventory service 120 automatically updates customer server 454 via customer API 452 when confidence level 324 in trailer identifier 322 are above a certain threshold. Advantageously, use of confidence level 324 prevents updates being made to yard inventory 122 and/or customer server 454 when the identity of a trailer in a parking spot is uncertain. However, other actions may be taken to ensure any issue is resolved. For example, Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features

| Parameters | Update |
|---|---|
| Expected: a trailer with ID X<br>Observed: a trailer occupying a spot and trailer ID X<br>Confidence: sufficient | No change is made since the expected trailer ID matches the observed trailer ID with sufficient confidence from the ML model.<br>Note: this match could be made on the initial ML model detection or after finding a match in the inventory database using the Levenshtein distance calculation. |
| Expected: a trailer with ID X<br>Observed: a trailer with ID Y<br>Confidence: sufficient | Because the ML model observed a different trailer ID than the expected trailer ID with sufficient confidence, the following changes are made to inventory<br>Trailer Y is associated with the spot and Trailer X is dissociated from the spot<br>Trailer Y is dissociated from the previous spot if it was occupying another spot in inventory or it is created if it is not in the inventory database<br>Note: MC determines that the trailer with ID Y does not match the expected trailer with ID X after attempting to see if the IDs match using the Levenshtein distance calculation. |
| Expected: a trailer with ID X<br>Observed: no trailer<br>Confidence: sufficient | Because the ML model observed that the spot is empty with sufficient confidence, the following change is made to inventory<br>Trailer X is dissociated from the spot |
| Expected: no trailer<br>Observed: a trailer with ID X<br>Confidence: sufficient | Because the ML model observed a trailer with ID X with sufficient confidence, the following changes are made to inventory<br>Trailer X is associated with the spot<br>Trailer X is dissociated from the previous spot if it was occupying another spot in inventory or it is created if it is not in the inventory database |
| Expected: no trailer<br>Observed: no trailer<br>Confidence: sufficient | No change is made since the expected spot state (empty) matches the observed spot state (empty) with sufficient confidence from the ML model. |
| Expected: a trailer with ID X<br>Observed: a trailer with ID X<br>Confidence: insufficient | Since the ML model has insufficient confidence in its detections, the request to determine the spot state and trailer characteristics is sent to a human. If the human is confident in their response, the outcome then will be the same as the corresponding outcome in the ML model case described above. |
| Expected: a trailer with ID X<br>Observed: a trailer with ID Y<br>Confidence: insufficient | |
| Expected: a trailer with ID X<br>Observed: no trailer<br>Confidence: insufficient | If the human is not confident in their response, no update is made to inventory. |
| Expected: no trailer<br>Observed: a trailer occupying a spot and trailer ID X<br>Confidence: insufficient | |
| Expected: no trailer<br>Observed: no trailer<br>Confidence: insufficient | |

In any case where there is an insufficient level of confidence in the result from the ML model, the inventory request may be passed to a human in the loop for additional interpretation The above process and system may result in one or more of the following actions and consequences: trailer fingerprint described herein, as well as all statements of the scope of the present method and system, which, as a matter of language, might be said to fall therebetween.

Combination of Features

Features described above as well as those claimed below may be combined in various ways without departing from the scope hereof. The following enumerated examples illustrate some possible, non-limiting combinations:

(A1) An autonomous yard inventory system for a yard having a plurality of parking spots for trailers, including: a tractor having: a first camera fixedly mounted to the tractor and having a first field of view; at least one LIDAR fixedly mounted to the tractor; at least one processor; and memory storing machine-readable instructions that, when executed by the processor, cause the processor to: select, from images captured by the first camera as the tractor passes a first parking spot of the plurality of parking spots, at least one first image of the first parking spot; store the first image in the memory in association with the first parking spot; determine an occupancy of the first parking spot from LIDAR data generated by the LIDAR; and when the occupancy indicates a trailer is parked within the first parking spot: retrieve the first image corresponding to the first parking spot from the memory; determine, from the first image, a trailer identifier of the trailer parked in the first parking spot; and send a message, to an inventory service that updates a yard inventory, indicating the trailer with the trailer identifier is parked in the first parking spot.

(A2) In embodiments of (A1), the memory further including machine-readable instructions that when executed by the processor cause the processor to: when the occupancy indicates the parking spot is not occupied: retrieve the first image corresponding to the first parking spot from the memory; and send a second message indicating the first parking spot is unoccupied to the inventory service.

(A3) In either of the embodiments (A1) or (A2), the selecting and storing of the first image are independent of the determining of the occupancy of the first parking spot.

(A4) In any of the embodiments (A1)-(A3), the memory further including machine-readable instructions that when executed by the processor cause the processor to calculate a spot point-of-interest (POI) once for each parking spot in the yard, each spot POI defining a 3D location that is centered both horizontally and vertically on a front face of an average sized trailer parked up against a front edge of the respective first parking spot and other parking spots.

(A5) In any of the embodiments (A1)-(A4), the memory further including machine-readable instructions that when executed by the processor cause the processor to determine that the spot POI of the first parking spot is within a spot search radius from a current location of the tractor.

(A6) In any of the embodiments (A1)-(A5), the memory further including machine-readable instructions that when executed by the processor cause the processor to: calculate a distance between the spot POI of the first parking spot and a central axis of the first camera; and store the first image in the memory in association with the first parking spot when the distance is either (a) first calculated for the spot POI or (b) smaller than a previously calculated distance for the spot POI of the first parking spot.

(A7) In any of the embodiments (A1)-(A6), the memory further including machine-readable instructions that when executed by the processor cause the processor to determine that the first parking spot is occupied when an area within a costmap generated by the LIDAR and corresponding to the first parking spot is populated.

(A8) In any of the embodiments (A1)-(A7), the tractor further including a second camera fixedly mounted to the tractor and having a second field of view different from the first field of view, the memory further including machine-readable instructions that when executed by the processor cause the processor to: select, from second images captured by the second camera as the tractor passes the first parking spot, at least one second image of the first parking spot; and store the second image in the memory in association with the first parking spot; wherein the first image and the second image are retrieved from the memory for the first parking spot and included in the message.

(A9) In any of the embodiments (A1)-(A8), the memory further including machine-readable instructions that when executed by the processor cause the processor to: generate a first scan point at a first point distance from a base-link of the tractor along a projection line radiating at a scan line angle and from the base-link; and determine that a geographic location of the first scan point is within a rectangle of one parking spot in the yard; wherein the one parking spot is selected as the first parking spot to determine the occupancy.

(A10) In any of the embodiments (A1)-(A9), the base-link being defined as a point at ground level below a center of a rear axle of the tractor.

(A11) In any of the embodiments (A1)-(A10), the scan line angle being relative to a front of the tractor and configurable with a default value of 110°.

(A12) In any of the embodiments (A1)-(A11), the first point distance being configurable with a default value of 5 meters.

(A13) In any of the embodiments (A1)-(A12), the memory further including machine-readable instructions that when executed by the processor cause the processor to: generate a next scan point an interpoint distance further along the projection line from the first scan point; and determine that a geographic location of the next scan point is within a rectangle of one parking spot in the yard; wherein the one parking spot is selected as the first parking spot.

(A14) In any of the embodiments (A1)-(A13), the interpoint distance being configurable with a default value of 3 meters.

(A15) In any of the embodiments (A1)-(A14), the memory further including machine-readable instructions that when executed by the processor cause the processor to: generate a costmap from the LIDAR data; determine a number of occupied squares of the costmap within a rectangle of the first parking spot; and determine the first parking spot is occupied when the number is greater than a predefined threshold.

(A16) In any of the embodiments (A1)-(A15), the memory further including machine-readable instructions that when executed by the processor cause the processor to send the first image to a machine learning model configured to extract the trailer identifier from the first image, wherein the machine learning model indicates a confidence level for the trailer identifier.

(A17) In any of the embodiments (A1)-(A16), the memory further including machine-readable instructions that when executed by the processor cause the processor to send a second message to the inventory service requesting human assistance to determine the trailer identifier when the confidence level is below a confidence threshold.

(A18) In any of the embodiments (A1)-(A17), the tractor operating in either a passive mode whereby the yard inventory is autonomously updated as the tractor performs yard related missions and an active move whereby the tractor is directed to maneuver through the yard.

(A19) In any of the embodiments (A1)-(A18), the memory further including machine-readable instructions that when executed by the processor cause the processor to capture additional characteristics of the trailers, including one or more of: trailer length, trailer type, gladhand type, an assessment of service line connectivity, an assessment of trailer connectivity, trailer state, trailer damage, and other detectable trailer features.

(A20) In any of the embodiments (A1)-(A19), the inventory service including machine-readable instructions stored in non-transitory memory and executable by at least one processor to: receive the message from the tractor; and update the yard inventory based on the inventory update message.

(A21) In any of the embodiments (A1)-(A20), the inventory service further including machine-readable instructions stored in non-transitory memory and executable by the processor to determine that the inventory update message includes a valid trailer identifier based upon a weighted Levenshtein distance technique.

(B1) An autonomous yard inventory system, including: a yard inventory tracking location of trailers in parking spots of a facility; and an inventory service having machine-readable instructions stored in non-transitory memory and executable by at least one processor to: receive an inventory update message from an autonomous vehicle operating at the facility, the message including a trailer identifier and a parking spot identifier; determine that the inventory update message includes a valid trailer identifier based upon a weighted Levenshtein distance technique; and update the yard inventory based on the inventory update message.

(B2) The embodiments of (B1) further including: a trailer database storing trailer characteristics of the trailers associated with the facility and at least one other facility of a customer; and the inventory service further including machine-readable instructions stored in the non-transitory memory and executable by the at least one processor to: determine, based on the weighted Levenshtein distance technique as applied to the trailers within the yard inventory, that the trailer identifier is unknown to the facility; determine, based on the weighted Levenshtein distance technique as applied to the trailers within the trailer database, that the trailer identifier is known at other facilities; and update the yard inventory based on the inventory update message.

(B3) Either of the embodiments (B1) or (B2) further including a customer application programming interface (API) for interfacing with yard management software of the customer, wherein the trailer database and the yard inventory is updated via the customer API from the yard management software and the yard management software is updated via the customer API from at least one of the yard inventory and the trailer database.

What is claimed is:

1. An autonomous yard inventory system for a yard having a plurality of parking spots for trailers, comprising:
  a tractor having:
    a first camera fixedly mounted to the tractor and having a first field of view;
    at least one LIDAR fixedly mounted to the tractor;
    at least one processor; and
    memory storing machine-readable instructions that, when executed by the processor, cause the processor to:
      select, from images captured by the first camera as the tractor passes a first parking spot of the plurality of parking spots, at least one first image of the first parking spot;
      store the first image in the memory in association with the first parking spot;
      determine an occupancy of the first parking spot from LIDAR data generated by the LIDAR; and when the occupancy indicates a trailer is parked within the first parking spot:
      retrieve the first image corresponding to the first parking spot from the memory;
      send the first image to a machine learning model configured to extract a trailer identifier from the first image, wherein the machine learning model indicates a confidence level for the trailer identifier;
      send a message, to an inventory service that updates a yard inventory, indicating the trailer with the trailer identifier is parked in the first parking spot.

2. The autonomous yard inventory system of claim 1, the memory further comprising machine-readable instructions that when executed by the processor cause the processor to:
  when the occupancy indicates the parking spot is not occupied:
    retrieve the first image corresponding to the first parking spot from the memory; and
    send a second message indicating the first parking spot is unoccupied to the inventory service.

3. The autonomous yard inventory system of claim 1, wherein the selecting and storing of the first image are independent of the determining of the occupancy of the first parking spot.

4. The autonomous yard inventory system of claim 1, the memory further comprising machine-readable instructions that when executed by the processor cause the processor to calculate a spot point-of-interest (POI) once for each parking spot in the yard, each spot POI defining a 3D location that is centered both horizontally and vertically on a front face of an average sized trailer parked up against a front edge of the respective first parking spot and other parking spots.

5. The autonomous yard inventory system of claim 4, the memory further comprising machine-readable instructions that when executed by the processor cause the processor to determine that the spot POI of the first parking spot is within a spot search radius from a current location of the tractor.

6. The autonomous yard inventory system of claim 5, the memory further comprising machine-readable instructions that when executed by the processor cause the processor to:
  calculate a distance between the spot POI of the first parking spot and a central axis of the first camera; and
  store the first image in the memory in association with the first parking spot when the distance is either (a) first calculated for the spot POI or (b) smaller than a previously calculated distance for the spot POI of the first parking spot.

7. The autonomous yard inventory system of claim 1, the memory further comprising machine-readable instructions that when executed by the processor cause the processor to determine that the first parking spot is occupied when an area within a costmap generated by the LIDAR and corresponding to the first parking spot is populated.

8. The autonomous yard inventory system of claim 1, the tractor further comprising a second camera fixedly mounted to the tractor and having a second field of view different from the first field of view, the memory further comprising machine-readable instructions that when executed by the processor cause the processor to:
  select, from second images captured by the second camera as the tractor passes the first parking spot, at least one second image of the first parking spot; and
  store the second image in the memory in association with the first parking spot;

wherein the first image and the second image are retrieved from the memory for the first parking spot and included in the message.

9. The autonomous yard inventory system of claim 1, the memory further comprising machine-readable instructions that when executed by the processor cause the processor to:
  generate a first scan point at a first point distance from a base-link of the tractor along a projection line radiating at a scan line angle and from the base-link; and
  determine that a geographic location of the first scan point is within a rectangle of one parking spot in the yard;
  wherein the one parking spot is selected as the first parking spot to determine the occupancy.

10. The autonomous yard inventory system of claim 9, the base-link being defined as a point at ground level below a center of a rear axle of the tractor.

11. The autonomous yard inventory system of claim 9, the scan line angle being relative to a front of the tractor and configurable with a default value of 110°.

12. The autonomous yard inventory system of claim 9, the first point distance being configurable with a default value of 5 meters.

13. The autonomous yard inventory system of claim 9, the memory further comprising machine-readable instructions that when executed by the processor cause the processor to:
  generate a next scan point an interpoint distance further along the projection line from the first scan point; and
  determine that a geographic location of the next scan point is within a rectangle of one parking spot in the yard;
  wherein the one parking spot is selected as the first parking spot.

14. The autonomous yard inventory system of claim 13, the interpoint distance being configurable with a default value of 3 meters.

15. The autonomous yard inventory system of claim 1, the memory further comprising machine-readable instructions that when executed by the processor cause the processor to send a second message to the inventory service requesting human assistance to determine the trailer identifier when the confidence level is below a confidence threshold.

16. The autonomous yard inventory system of claim 1, wherein the tractor operates in either a passive mode whereby the yard inventory is autonomously updated as the tractor performs yard related missions and an active move whereby the tractor is directed to maneuver through the yard.

17. The autonomous yard inventory system of claim 1, the memory further comprising machine-readable instructions that when executed by the processor cause the processor to capture additional characteristics of the trailers, including one or more of: trailer length, trailer type, gladhand type, an assessment of service line connectivity, an assessment of trailer connectivity, trailer state, trailer damage, and other detectable trailer features.

18. An autonomous yard inventory system for a yard having a plurality of parking spots for trailers, comprising:
a tractor having:
  a first camera fixedly mounted to the tractor and having a first field of view;
  at least one LIDAR fixedly mounted to the tractor;
  at least one processor; and memory storing machine-readable instructions that, when executed by the processor, cause the processor to:
    select, from images captured by the first camera as the tractor passes a first parking spot of the plurality of parking spots, at least one first image of the first parking spot;
    store the first image in the memory in association with the first parking spot;
    determine an occupancy of the first parking spot from LIDAR data generated by the LIDAR; and
    when the occupancy indicates a trailer is parked within the first parking spot:
      retrieve the first image corresponding to the first parking spot from the memory;
      determine, from the first image, a trailer identifier of the trailer parked in the first parking spot; and
      send a message, to an inventory service that updates a yard inventory, indicating the trailer with the trailer identifier is parked in the first parking spot;
the memory further comprising machine-readable instructions that when executed by the processor cause the processor to:
  generate a costmap from the LIDAR data;
  determine a number of occupied squares of the costmap within a rectangle of the first parking spot; and
  determine the first parking spot is occupied when the number is greater than a predefined threshold.

19. An autonomous yard inventory system for a yard having a plurality of parking spots for trailers, comprising:
a tractor having:
  a first camera fixedly mounted to the tractor and having a first field of view;
  at least one LIDAR fixedly mounted to the tractor;
  at least one processor; and
  memory storing machine-readable instructions that, when executed by the processor, cause the processor to:
    select, from images captured by the first camera as the tractor passes a first parking spot of the plurality of parking spots, at least one first image of the first parking spot;
    store the first image in the memory in association with the first parking spot;
    determine an occupancy of the first parking spot from LIDAR data generated by the LIDAR; and
    when the occupancy indicates a trailer is parked within the first parking spot:
      retrieve the first image corresponding to the first parking spot from the memory;
      determine, from the first image, a trailer identifier of the trailer parked in the first parking spot; and
      send a message, to an inventory service that updates a yard inventory, indicating the trailer with the trailer identifier is parked in the first parking spot;
the inventory service comprising machine-readable instructions stored in non-transitory memory and executable by at least one processor to:
  receive the message from the tractor;
  determine that the message includes a valid trailer identifier based upon a weighted Levenshtein distance technique; and
  update the yard inventory based on the inventory update message.

* * * * *